US012169129B2

(12) United States Patent
Lee et al.

(10) Patent No.: US 12,169,129 B2
(45) Date of Patent: Dec. 17, 2024

(54) ROUTE PROVISION APPARATUS AND ROUTE PROVISION METHOD THEREFOR

(71) Applicant: LG ELECTRONICS INC., Seoul (KR)

(72) Inventors: Jinsang Lee, Seoul (KR); Seunghwan Bang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 17/797,997

(22) PCT Filed: Feb. 5, 2020

(86) PCT No.: PCT/KR2020/001674
§ 371 (c)(1),
(2) Date: Aug. 5, 2022

(87) PCT Pub. No.: WO2021/157760
PCT Pub. Date: Aug. 12, 2021

(65) Prior Publication Data
US 2023/0055708 A1 Feb. 23, 2023

(51) Int. Cl.
*G01C 21/30* (2006.01)
*B60W 60/00* (2020.01)
(Continued)

(52) U.S. Cl.
CPC ........... *G01C 21/30* (2013.01); *B60W 60/001* (2020.02); *G01C 21/3691* (2013.01);
(Continued)

(58) Field of Classification Search
CPC .......................... G01C 21/30; G01C 21/3691; G01C 21/3893; G01C 21/3407; B60W 60/001; B60W 2556/50; B60W 2556/65
See application file for complete search history.

(56) References Cited

U.S. PATENT DOCUMENTS

2011/0288762 A1* 11/2011 Kuznetsov ......... G01C 21/3896
701/532
2015/0166072 A1* 6/2015 Powers ............... B60W 40/076
701/1
(Continued)

FOREIGN PATENT DOCUMENTS

CN 108362295 A * 8/2018 ......... G01C 21/3415
DE 102017125844 A1 * 5/2018 ............. G01C 21/32
(Continued)

OTHER PUBLICATIONS

PCT International Application No. PCT/KR2020/001674, International Search Report dated Sep. 4, 2020, 4 pages.

*Primary Examiner* — Rami Khatib
(74) *Attorney, Agent, or Firm* — LEE, HONG, DEGERMAN, KANG & WAIMEY

(57) ABSTRACT

A route provision apparatus for providing a route to a vehicle including a transceiver; a sensor interface configured to receive sensing information from one or more sensors; and a processor configured to identify a lane of the vehicle, estimate, using map information received from a navigation system and not from the server based on a communication state with the server satisfying a preset condition, an optimal route for the vehicle in lane units, generate autonomous driving visibility information by fusing the sensing information with the optimal route, and fuse dynamic information related to a movable object with the autonomous driving visibility information to update the optimal path based on the dynamic information, and wherein the sensing information is fused with the map information to generate a Simultaneous Localization and Mapping (SLAM) map.

12 Claims, 22 Drawing Sheets

(51) Int. Cl.
*G01C 21/00* (2006.01)
*G01C 21/36* (2006.01)

(52) U.S. Cl.
CPC ..... *G01C 21/3893* (2020.08); *B60W 2556/50* (2020.02); *B60W 2556/65* (2020.02)

(56) References Cited

U.S. PATENT DOCUMENTS

| | | | | |
|---|---|---|---|---|
| 2016/0327948 | A1* | 11/2016 | Taguchi | G05D 1/0257 |
| 2017/0371349 | A1* | 12/2017 | Kim | G08G 1/0133 |
| 2018/0051990 | A1* | 2/2018 | Takeuchi | G08G 1/096827 |
| 2019/0227545 | A1* | 7/2019 | Yoo | G05D 1/0223 |
| 2019/0383627 | A1* | 12/2019 | Nangeroni | B60W 50/0098 |
| 2021/0342600 | A1* | 11/2021 | Westmacott | G06F 18/2148 |
| 2022/0024492 | A1* | 1/2022 | Panttila | B60W 60/0016 |
| 2022/0075387 | A1* | 3/2022 | Choi | B60W 30/14 |

FOREIGN PATENT DOCUMENTS

| | | | |
|---|---|---|---|
| JP | 6269566 | | 1/2018 |
| JP | 2018-028489 | | 2/2018 |
| JP | 2019139107 | A * | 8/2019 |
| KR | 10-2015-0060953 | | 6/2015 |
| KR | 10-2017-0082165 | | 7/2017 |
| KR | 10-2018-0000672 | | 1/2018 |

\* cited by examiner

[ V2X-LDM ]

[ eHorizon-ADASIS ]

ROUTE PROVISION APPARATUS AND ROUTE PROVISION METHOD THEREFOR

CROSS-REFERENCE TO RELATED APPLICATIONS

This application is the National Stage filing under 35 U.S.C. 371 of International Application No. PCT/KR2020/001674, filed on Feb. 5, 2020, the contents of which are hereby incorporated by reference herein its entirety.

TECHNICAL FIELD

The present disclosure relates to a route provision apparatus for providing a route to a vehicle and a route provision method therefor.

BACKGROUND ART

A vehicle refers to means of transporting people or goods by using kinetic energy. Representative examples of vehicles include automobiles and motorcycles.

For safety and convenience of a user who uses the vehicle, various sensors and devices are disposed at the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

For convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

As the development of the advanced driver assistance system (ADAS) is actively undergoing in recent time, development of a technology for optimizing user's convenience and safety while driving a vehicle is required.

As part of this effort, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assistance Systems Interface Specification (ADASIS)."

In addition, eHorizon (software) is becoming an integral part of safety/ECO/convenience of autonomous vehicles in a connected environment.

DISCLOSURE OF INVENTION

Technical Problem

The present disclosure is directed to solving the aforementioned problems and other drawbacks.

The present disclosure also describes a route provision apparatus capable of providing autonomous driving visibility information allowing autonomous driving, and a route provision method therefor.

The present disclosure further describes a route provision apparatus capable of providing autonomous driving visibility information used for autonomous driving even when communication with a server is poor, and a route provision method therefor.

Solution to Problem

The present disclosure describes a route provision apparatus for providing a route to a vehicle, and a route provision method therefor.

A route provision apparatus according to one implementation which is an apparatus for providing a route to a vehicle, may include a transceiver configured to communicate with a server; a sensor interface configured to receive sensing information from one or more sensors disposed in the vehicle; and a processor configured to: identify a lane in which the vehicle is traveling among a plurality of lanes of a road based on an image received from an image sensor among the sensing information, estimate, using received map information, an optimal route for the vehicle in lane units based on the identified lane, generate autonomous driving visibility information by fusing the sensing information with the optimal route for transmission to the server and at least electric component disposed in the vehicle, and fuse dynamic information related to a movable object located along the optimal route with the autonomous driving visibility information to update the optimal path based on the dynamic information, wherein the map information is received from a navigation system provided at the vehicle and not from the server based on a communication state with the server satisfying a preset condition, and wherein the processor is further configured to fuse the sensing information received from the one or more sensors with the map information received from the navigation system to generate a Simultaneous Localization and Mapping (SLAM) map.

In one implementation, the preset condition includes at least one of: not being able to receive map information from the server, a communication rate for receiving map information from the server being slower than or equal to a predetermined speed, or there being no map information received from the server for a predetermined distance ahead of the vehicle.

In one implementation, the processor is further configured to receive route information to a destination from the navigation system, and wherein the received map information reflects the route information to the destination.

In one implementation, the map information received from the server may be high-definition (HD) map information, and the map information received from the navigation system may be standard-definition (SD) map information.

In one implementation, when fusing the sensing information with the map information is performed based on the route information to the destination.

In one implementation, the sensing information used for generating the SLAM map is limited to sensing information within a predetermined range based on the route information.

In one implementation, the processor is further configured to receive dynamic information from the server or other nearby vehicles, and apply the received dynamic information to the SLAM map.

In one implementation, the dynamic information applied to the SLAM map is limited to dynamic information within a predetermined range based on the route information.

In one implementation, the SLAM map, to which the dynamic information has been applied, is set as autonomous driving visibility information, and the processor is configured to cause the vehicle to be autonomously driven based on the SLAM map.

In one implementation, the dynamic information includes information on an object that cannot be detected by the one or more sensors disposed in the vehicle.

In one implementation, the processor is configured to continuously generate the SLAM map as the vehicle is traveling according to the route information.

In one implementation, the processor is configured to transmit the generated the SLAM map to other vehicles within a preset distance through V2X communication.

In one implementation, the processor is further configured to determine information related to the lane in which the vehicle is traveling, a surrounding environment, and surrounding objects based on the sensing information, wherein the SLAM map is generated such that the determined information is reflected on the map information received from the navigation system.

In one implementation, the optimal route and the autonomous driving visibility information are generated based on the generated SLAM map.

In one implementation, the map information is received from the server based on the communication state with the server not satisfying the preset condition, and the map information received from the server is high-definition (HD) map information.

A method of providing a route to a vehicle may include receiving sensing information from one or more sensors disposed in the vehicle, identifying a lane in which the vehicle is traveling among a plurality of lanes of a road based on an image received from an image sensor among the sensing information, estimating, using received map information, an optimal route for the vehicle in lane units based on the identified lane, generating autonomous driving visibility information by fusing the sensing information with the optimal route for transmission to the server and at least electric component disposed in the vehicle, and fusing dynamic information related to a movable object located along the optimal route with the autonomous driving visibility information to update the optimal path based on the dynamic information, wherein the map information is received from a navigation system provided at the vehicle and not from the server based on a communication state with the server satisfying a preset condition, and fusing the sensing information received from the one or more sensors with the map information received from the navigation system to generate a Simultaneous Localization and Mapping (SLAM) map.

According to another embodiment of the present disclosure, a non-transitory computer readable medium having instructions stored thereon for: receiving sensing information from one or more sensors disposed in the vehicle, identifying a lane in which the vehicle is traveling among a plurality of lanes of a road based on an image received from an image sensor among the sensing information, estimating, using received map information, an optimal route for the vehicle in lane units based on the identified lane, generating autonomous driving visibility information by fusing the sensing information with the optimal route for transmission to the server and at least electric component disposed in the vehicle, and fusing dynamic information related to a movable object located along the optimal route with the autonomous driving visibility information to update the optimal path based on the dynamic information, wherein the map information is received from a navigation system provided at the vehicle and not from the server based on a communication state with the server satisfying a preset condition, and fusing the sensing information received from the one or more sensors with the map information received from the navigation system to generate a Simultaneous Localization and Mapping (SLAM) map.

Advantageous Effects of Invention

Hereinafter, effects of a route provision apparatus and a route provision method therefor according to the present disclosure will be described.

First, the present disclosure can provide a route provision apparatus that is optimized for generating or updating autonomous driving visibility information.

Second, the present disclosure can provide a new control method capable of generating a SLAM map using an SD map pre-stored in the vehicle and sensing information, so that the vehicle can autonomously drive itself using the generated SLAM map as autonomous driving visibility information, in case where an HD map required to generate the autonomous driving visibility information is not smoothly received from a server.

MODE FOR THE INVENTION

Figure 1:
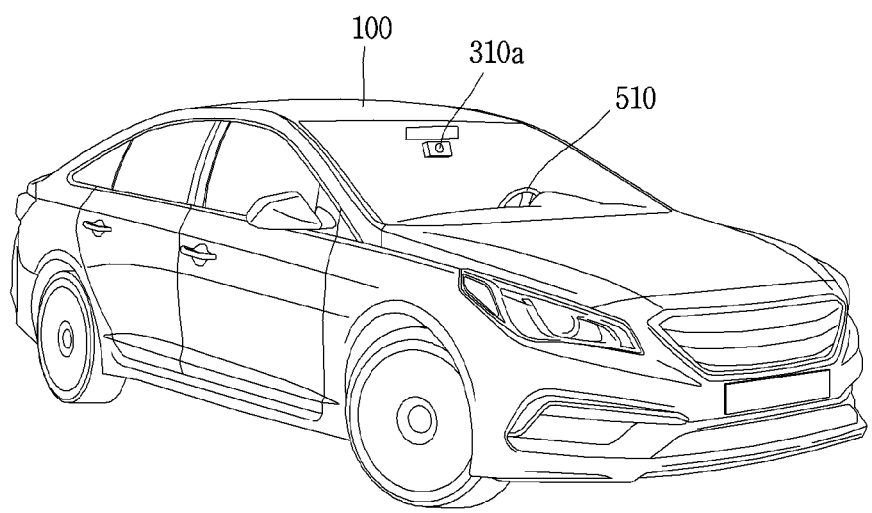
FIG. 1 is a diagram illustrating appearance of a vehicle in accordance with an implementation.
Figure 1:
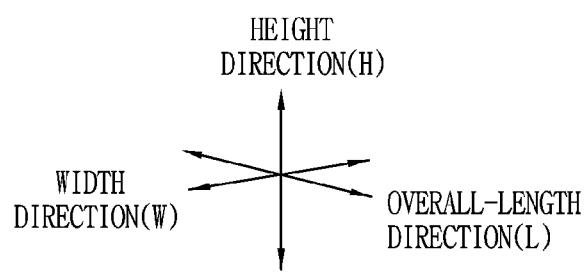

Description will now be given in detail according to one or more implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a vehicle including any of an internal combustion engine car having an engine as a power source, a hybrid vehicle having an engine and an electric motor as power sources, an electric vehicle having an electric motor as a power source, and the like.

In the following description, a left side of a vehicle refers to a left side with respect to a driving direction of the vehicle, and a right side of the vehicle refers to a right side with respect to the driving direction.

FIG. 1 is a diagram illustrating appearance of a vehicle in accordance with an implementation of the present disclosure.

Figure 2:
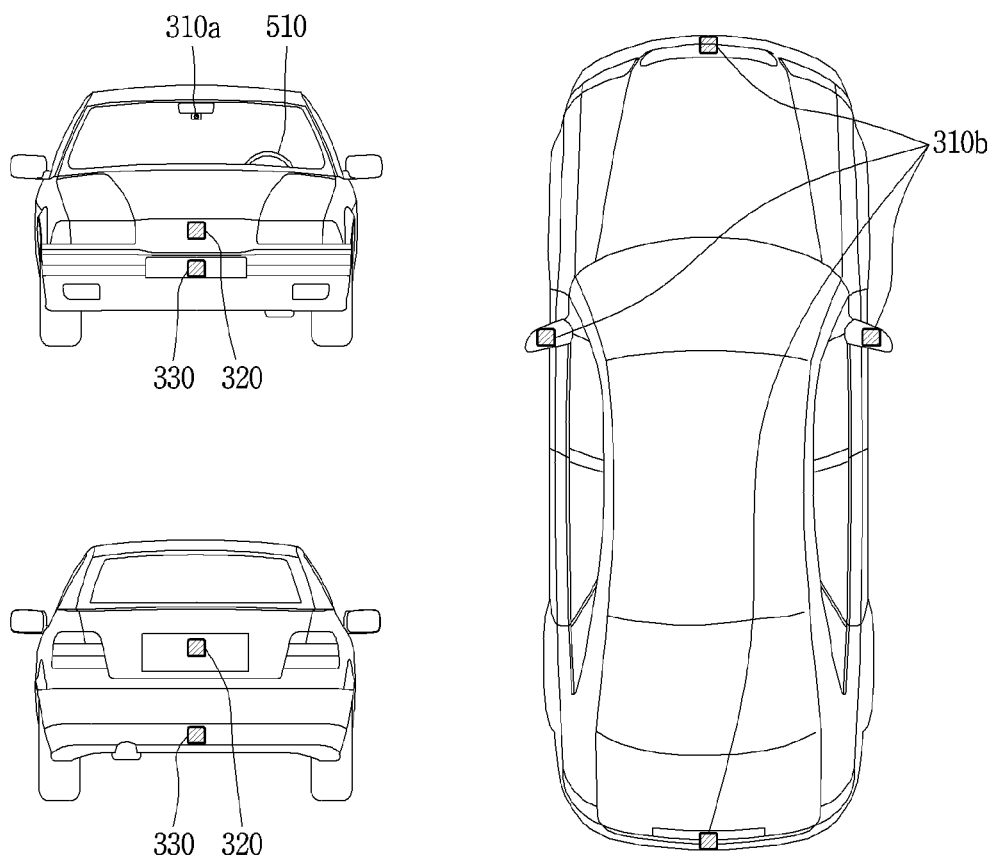
FIG. 2 is a diagram illustrating an outside of the vehicle at various angles in accordance with the implementation.

FIG. 2 is a diagram illustrating appearance of a vehicle at various angles in accordance with an implementation of the present disclosure.

Figure 3:
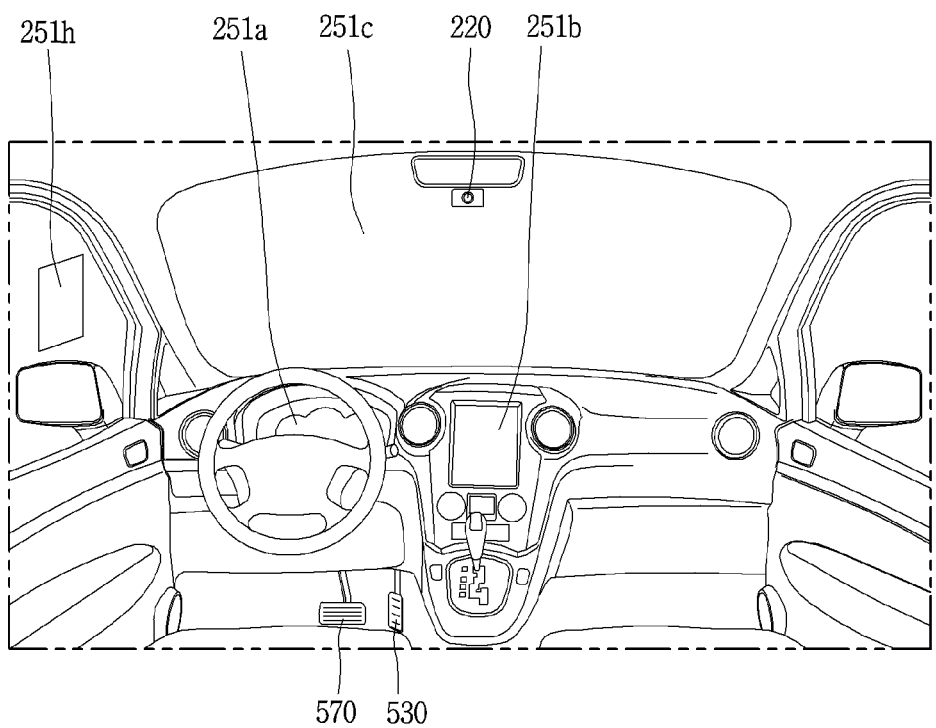
FIGS. 3 and 4 are diagrams illustrating an inside of the vehicle in accordance with the implementation.
Figure 4:
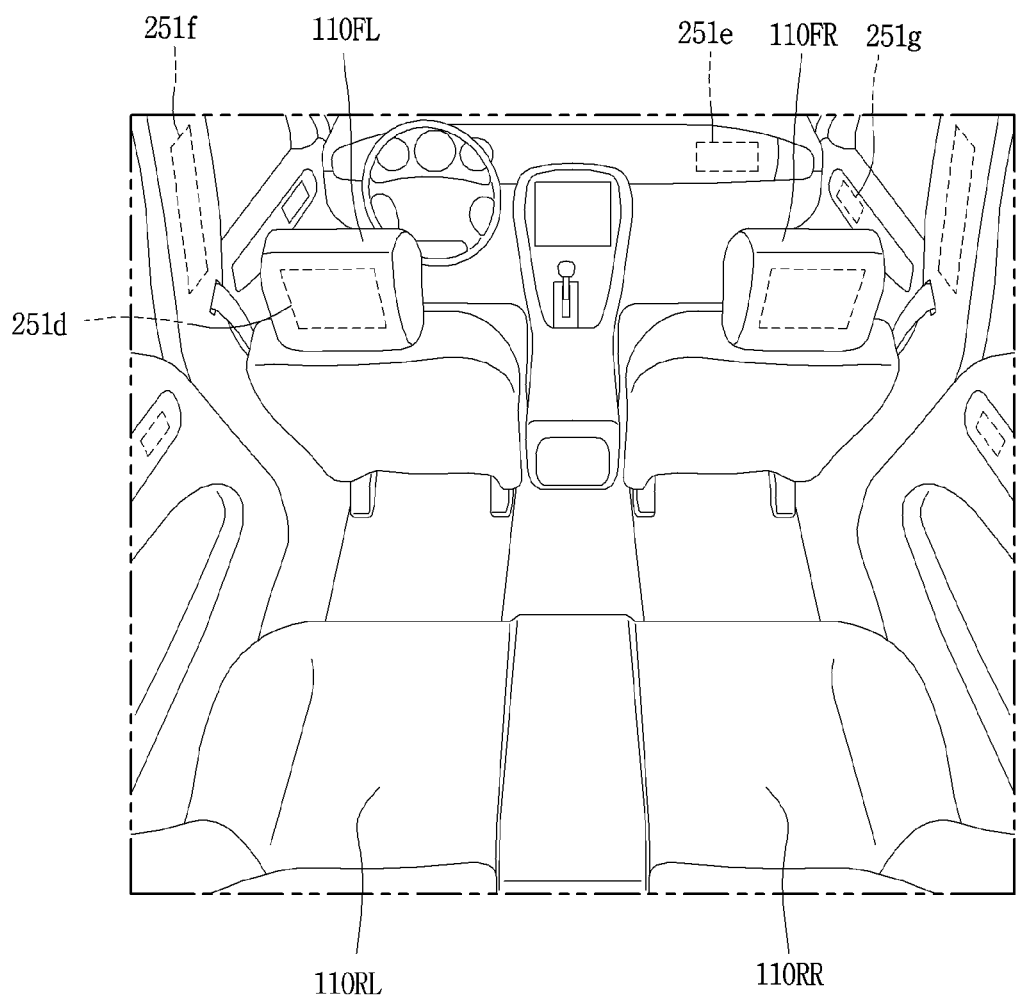

FIGS. 3 and 4 are diagrams illustrating an inside of the vehicle in accordance with the implementation.

Figure 5:
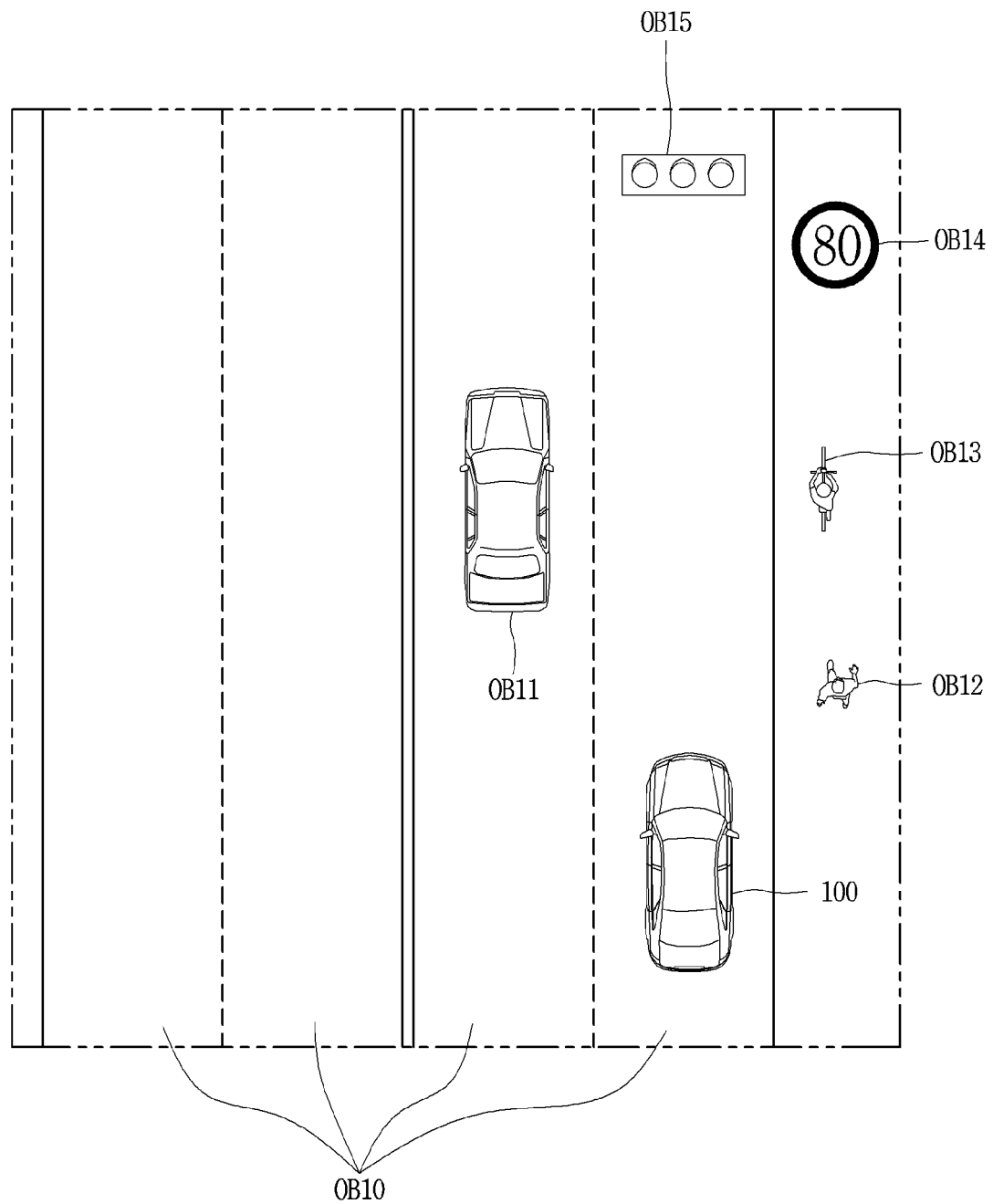
FIGS. 5 and 6 are reference views illustrating objects in accordance with an implementation.
Figure 6:
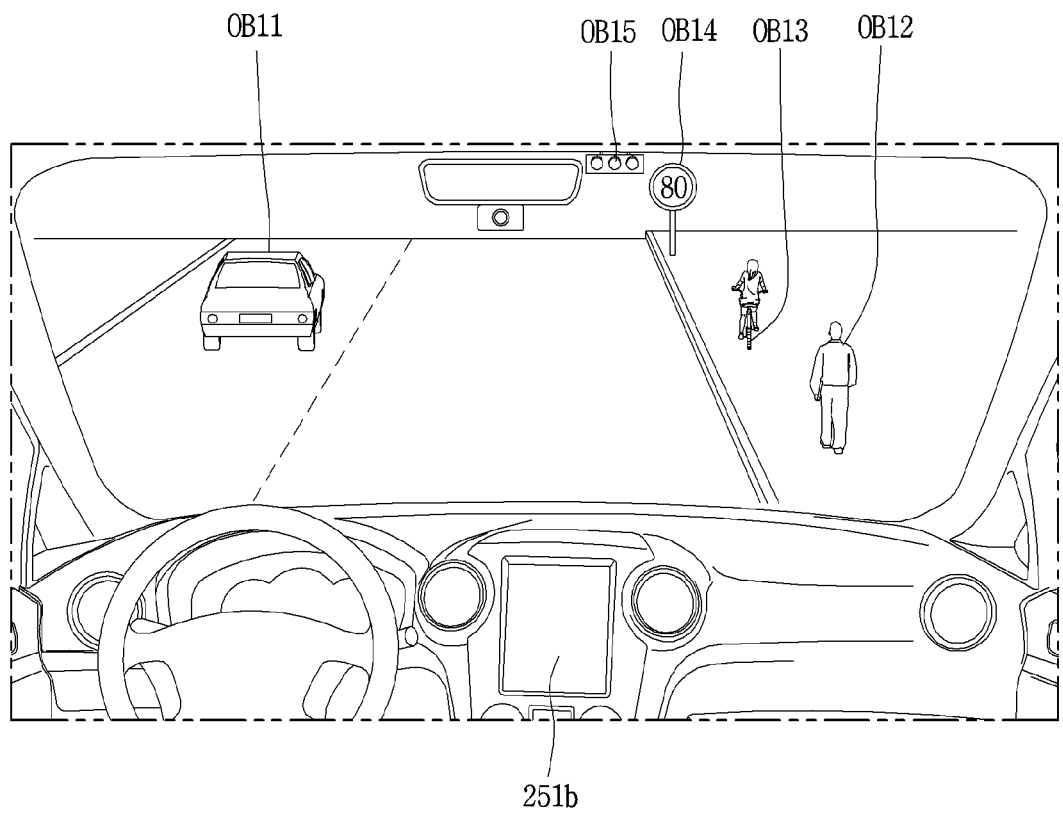

FIGS. 5 and 6 are reference views illustrating objects in accordance with an implementation.

Figure 7:
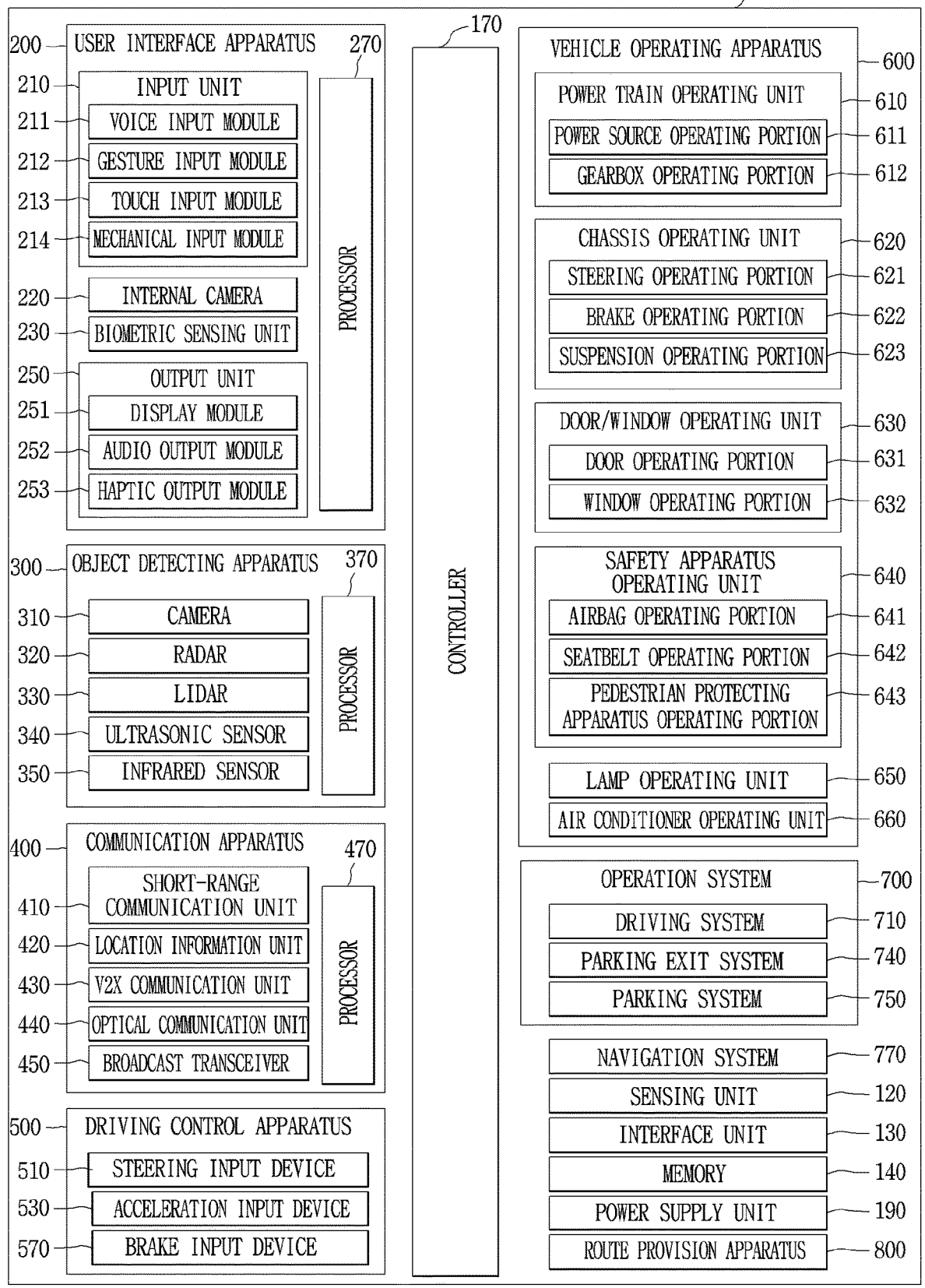
FIG. 7 is a block diagram illustrating a vehicle in accordance with an implementation.

FIG. 7 is a block diagram illustrating an exemplary vehicle.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740, or a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width from the left side to the right side of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

In some implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350, and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may each include a corresponding processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications may include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring location information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. In some examples, the steering input device 510 may be configured in the form of a wheel allowing a steering input in a rotating manner. In some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some examples, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some examples, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

In some implementations, the operation system 700 may further include other components in addition to components to be described, or may not include some of the components to be described.

In some examples, the operation system 700 may include at least one processor. Each unit of the operation system 700 may individually include at least one processor.

In some implementations, the operation system may be implemented by the controller 170 when it is implemented in a software configuration.

In some implementations, the operation system 700 may be implemented by at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, route information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a route provision apparatus 800.

The route provision apparatus 800 may control at least one of those components illustrated in FIG. 7. From this perspective, the route provision apparatus 800 may be the controller 170.

Without a limit to this, the route provision apparatus 800 may be a separate device, independent of the controller 170. When the route provision apparatus 800 is implemented as a component independent of the controller 170, the route provision apparatus 800 may be provided on a part of the vehicle 100.

Hereinafter, description will be given of implementations in which the route provision apparatus 800 is a component which is separate from the controller 170, for the sake of explanation. In this specification, functions (operations) and control methods described in relation to the route provision apparatus 800 may be executed by the controller 170 of the vehicle. That is, every detail described in relation to the route provision apparatus 800 may be applied to the controller 170 in the same/like manner.

Also, the route provision apparatus 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of a method of autonomously traveling a vehicle in an optimized manner or providing route information optimized for the travel of the vehicle, with reference to the accompanying drawings.

Figure 8:
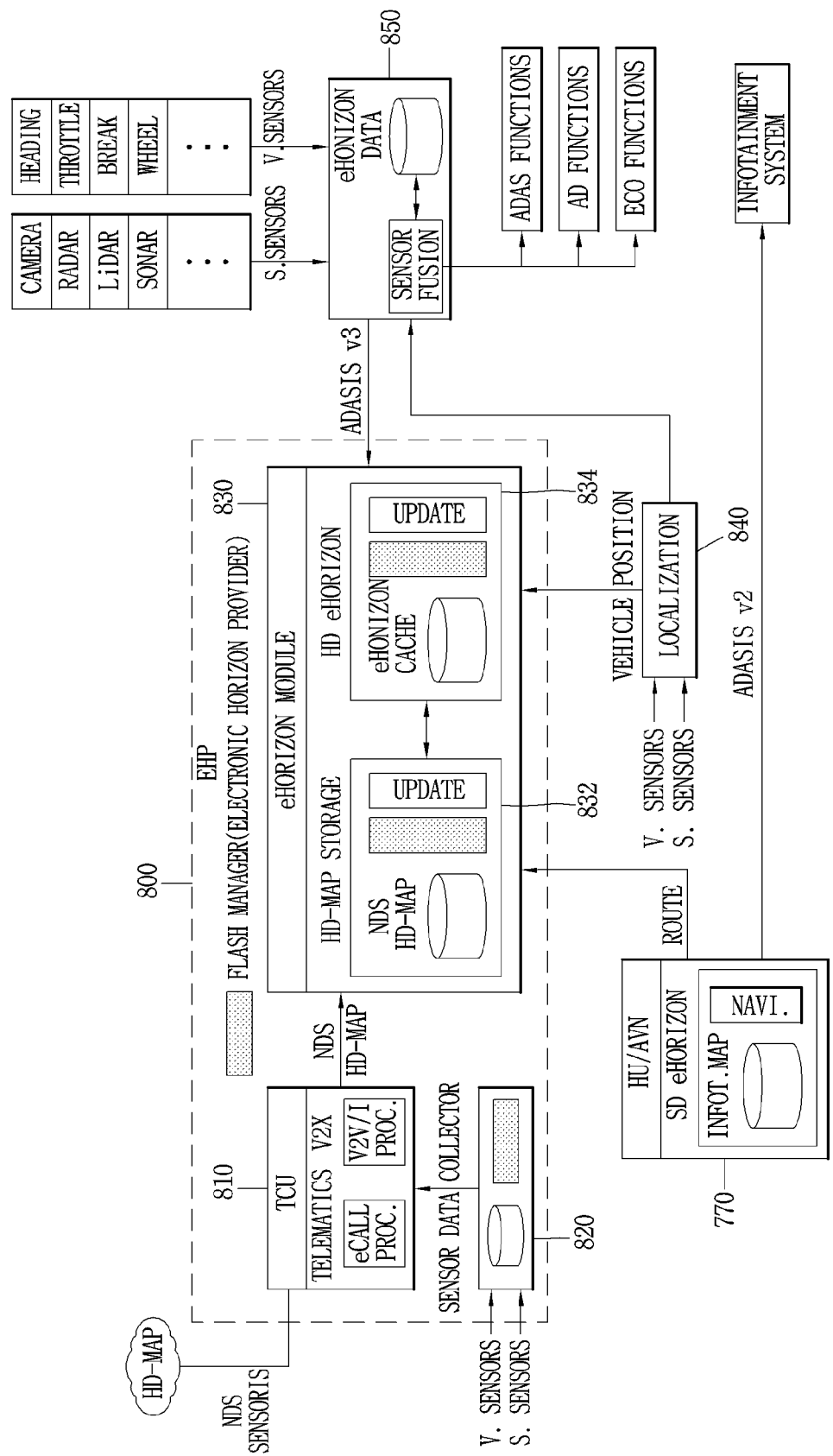
FIG. 8 is a diagram illustrating Electronic Horizon Provider (EHP).

FIG. 8 is a diagram illustrating Electronic Horizon Provider (EHP).

Referring to FIG. 8, a route provision apparatus 800 associated with the present disclosure may control the vehicle 100 based on eHorizon (electronic Horizon).

The route provision apparatus 800 may include an electronic horizon provider (EHP). The EHP may be referred to as a processor 830 in this specification.

Here, Electronic Horizon may be referred to as 'ADAS Horizon', 'ADASIS Horizon', 'Extended Driver Horizon' or 'eHorizon'.

The eHorizon may be understood as software, a module or a system that performs the functions of generating a vehicle's forward route information (e.g., using high-definition (HD) map data), configuring the vehicle's forward route information based on a specified standard (protocol) (e.g., a standard specification defined by the ADAS), and transmitting the configured vehicle forward route information to an application (e.g., an ADAS application, a map application, etc.) which may be installed in a module (for example, an ECU, a controller 170, a navigation system 770, etc.) of the vehicle or in the vehicle requiring map information (or route information).

A device implementing the operation/function/control method performed by the eHorizon may be the processor 830 (EHP) and/or the route provision apparatus 800. That is, the eHorizon may be installed or included in the processor 830.

In some systems, the vehicle's forward path (or a path to the destination) is only provided as a single path based on a navigation map. In some implementations, eHorizon may provide lane-based route information based on a high-definition (HD) map.

Data generated by eHorizon may be referred to as 'electronic horizon data', 'eHorizon data', 'autonomous driving visibility information' or 'ADASIS message'.

The electronic horizon data may be described as driving plan data used when generating a driving control signal of the vehicle 100 in a driving (traveling) system. For example, the electronic horizon data may be understood as driving plan data in a range from a point where the vehicle 100 is located to horizon (visibility) (a preset distance or destination).

Here, the horizon may be understood as a point in front of the point where the vehicle 100 is located, by a preset distance, on the basis of a preset travel path. The horizon may refer to a point where the vehicle 100 is to reach after a predetermined time from the point, at which the vehicle 100 is currently located, along a preset travel path. Here, the travel path may refer to a path for the vehicle to travel up to a final destination, or may refer to an optimal route on which the vehicle is expected to travel when a destination is not set. The destination may be set by a user input.

Electronic horizon data may include horizon map data and horizon path data. The horizon map data may include at least one of topology data, ADAS data, HD map data, and dynamic data. According to an embodiment, the horizon map data may include a plurality of layers. For example, the horizon map data may include a first layer that matches topology data, a second layer that matches ADAS data, a third layer that matches HD map data, and a fourth layer that matches dynamic data. The horizon map data may further include static object data.

Topology data may be described as a map created by connecting road centers. Topology data is suitable for roughly indicating the position of a vehicle and may be in the form of data mainly used in a navigation for a driver. Topology data may be understood as data for road information excluding lane-related information. Topology data may be generated based on data received by an infrastructure through V2I. Topology data may be based on data generated in an infrastructure. Topology data may be based on data stored in at least one memory included in the vehicle 100.

ADAS data may refer to data related to road information. ADAS data may include at least one of road slope data, road curvature data, and road speed limit data. ADAS data may further include no-passing zone data. ADAS data may be based on data generated in an infrastructure. ADAS data may be based on data generated by the object detecting apparatus 300. ADAS data may be named road information data.

HD map data may include detailed lane-unit topology information of a road, connection information of each lane, and feature information for localization of a vehicle (e.g., traffic signs, lane marking/attributes, road furniture, etc.). HD map data may be based on data generated in an infrastructure.

Dynamic data may include various dynamic information that may be generated on a road. For example, the dynamic data may include construction information, variable-speed lane information, road surface state information, traffic information, moving object information, and the like. Dynamic data may be based on data received by an infrastructure. Dynamic data may be based on data generated by the object detecting apparatus 300.

The route provision apparatus 800 may provide map data within a range from a point where the vehicle 100 is located to the horizon. The horizon path data may be described as a trajectory that the vehicle 100 may take within the range from the point where the vehicle 100 is located to the horizon. The horizon path data may include data indicating a relative probability to select one road at a decision point (e.g., fork, intersection, crossroads, etc.). Relative probability may be calculated based on a time taken to arrive at a final destination. For example, if a shorter time is taken to arrive at the final destination when selecting a first road than when selecting a second road at a decision point, the probability to select the first road may be calculated higher than the probability to select the second road.

The horizon path data may include a main path and a sub path. The main path may be understood as a trajectory connecting roads with a higher relative probability to be selected. The sub path may be merged with or diverged from at least one point on the main path. The sub path may be understood as a trajectory connecting at least one road having a low relative probability to be selected from the at least one decision point on the main path.

The main path may be referred to as an optimal route and the sub path may be referred to as a sub route.

eHorizon may be classified into categories such as software, system, concept, and the like. eHorizon denotes a configuration of fusing real-time events, such as road shape information of a high-definition map, real-time traffic signs, road surface conditions, accidents and the like, and dynamic information related to moving objects under a connected environment of an external server (cloud server), V2X (Vehicle to everything) or the like, and providing the fused information to the autonomous driving system and the infotainment system.

In other words, eHorizon may perform the role of transferring a road shape on a high-definition map and real-time events with respect to the front of the vehicle to the autonomous driving system and the infotainment system under an external server/V2X environment.

In order to effectively transfer eHorizon data (electronic horizon data or autonomous driving visibility information) transmitted (generated) from eHorizon (i.e., external server) to the autonomous driving system and the infotainment system, a data specification and transmission method may be formed in accordance with a technical standard called "Advanced Driver Assistance Systems Interface Specification (ADASIS)."

The vehicle 100 may use information, which is received (generated) in eHorizon, in an autonomous driving system and/or an infotainment system.

For example, the autonomous driving system may use eHorizon data provided by eHorizon in safety and ECO aspects.

In terms of the safety aspect, the vehicle 100 (or the route provision apparatus 800) may perform an Advanced Driver Assistance System (ADAS) function such as Lane Keeping Assist (LKA), Traffic Jam Assist (TJA) or the like, and/or an AD (AutoDrive) function such as passing, road joining, lane change or the like, by using road shape information and event information received from eHorizon and surrounding object information sensed through the sensing unit disposed at the vehicle.

Furthermore, in terms of the ECO aspect, the vehicle 100 (or the route provision apparatus 800) may receive slope information, traffic light information, and the like related to a forward road from eHorizon, to control the vehicle so as to get efficient engine output, thereby enhancing fuel efficiency.

The infotainment system may include convenience aspect.

For example, the vehicle 100 may receive from eHorizon accident information, road surface condition information, and the like related to a road ahead of the vehicle and output them on a display unit (for example, Head Up Display (HUD), CID, Cluster, etc.) disposed at the vehicle, so as to provide guide information for the driver to drive the vehicle safely.

eHorizon (external server) may receive location information related to various types of event information (e.g., road surface condition information, construction information, accident information, etc.) occurred on roads and/or road-based speed limit information from the vehicle 100 or other vehicles or may collect such information from infrastructures (for example, measuring devices, sensing devices, cameras, etc.) installed on the roads.

In addition, the event information and the road-based speed limit information may be linked to map information or may be updated.

In addition, the location information related to the event information may be divided into lane units.

By using such information, the eHorizon system (EHP) of the present disclosure can provide information necessary for the autonomous driving system and the infotainment system to each vehicle, based on a high-definition map on which road conditions (or road information) can be determined on the lane basis.

In other words, an Electronic Horizon (eHorizon) Provider (EHP) may provide an absolute high-definition map using absolute coordinates of road-related information (for example, event information, location information regarding the vehicle 100, etc.) based on a high-definition map.

The road-related information provided by the eHorizon may be information included in a predetermined area (predetermined space) with respect to the vehicle 100.

The EHP may be understood as a component which is included in an eHorizon system and performs functions provided by the eHorizon (or eHorizon system).

The path providing device 800 of the present disclosure may be EHP, as shown in FIG. 8.

The route provision apparatus 800 (EHP) may receive a high-definition map from an external server (or a cloud server), generate route information to a destination in lane units, and transmit the high-definition map and the route information generated in the lane units to a module or application (or program) of the vehicle requiring the map information and the route information.

Referring to FIG. 8, FIG. 8 illustrates an overall structure of an Electronic Horizon (eHorizon) system of the present disclosure.

The route provision apparatus 800 may include a telecommunication control unit (TCU) 810 that receives a high-definition map (HD-map) existing in a cloud server.

The TCU 810 may be the communication apparatus 400 described above, and may include at least one of components included in the communication apparatus 400.

The TCU 810 may include a telematics module or a vehicle to everything (V2X) module.

The TCU 810 may receive an HD map that complies with the Navigation Data Standard (NDS) (or conforms to the NDS standard) from the cloud server.

In addition, the HD map may be updated by reflecting data sensed by sensors provided in the vehicle and/or sensors installed around road, according to the sensor ingestion interface specification (SENSORIS).

The TCU 810 may download the HD map from the cloud server through the telematics module or the V2X module.

In addition, the route provision apparatus 800 may include an interface unit 820. Specifically, the interface unit 820 receives sensing information from one or more sensors disposed at the vehicle 100.

In some cases, the interface unit 820 may be referred to as a sensor data collector.

The interface unit 820 collects (receives) information sensed by sensors (V.Sensors) disposed at the vehicle for detecting a manipulation of the vehicle (e.g., heading, throttle, break, wheel, etc.) and sensors (S.Sensors) for detecting surrounding information of the vehicle (e.g., Camera, Radar, LiDAR, Sonar, etc.)

The interface unit 820 may transmit the information sensed through the sensors disposed at the vehicle to the TCU 810 (or a processor 830) so that the information is reflected in the HD map.

The communication unit 810 may update the HD map stored in the cloud server by transmitting the information transmitted from the interface unit 820 to the cloud server. The route provision apparatus 800 may include a processor 830 (or an eHorizon module).

In this specification, the EHP may be the route provision apparatus 800 or the processor 830.

The processor 830 may control the communication unit 810 and the interface unit 820.

The processor 830 may store the HD map received through the communication unit 810, and update the HD map using the information received through the interface unit 820. This operation may be performed in the storage part 832 of the processor 830.

The processor 830 may receive first route information from an audio video navigation (AVN) or a navigation system 770.

The first route information is route information provided in the related art and may be information for guiding a traveling path (travel path, driving path, driving route) to a destination.

In this case, the first route information provided in the related art provides only one route information and does not distinguish lanes. The first route information may merely guide a road on which the vehicle must travel (pass) to reach a destination, but does not guide a lane for the vehicle to travel on the road.

In some implementations, when the processor 830 receives the first route information, the processor 830 may generate second route information for guiding, in lane units, a travel path up to the destination set in the first route information, by using the HD map and the first route information. For example, the operation may be performed by a calculation part 834 of the processor 830.

In addition, the eHorizon system may include a localization unit 840 for identifying the position or location of the vehicle by using information sensed through the sensors (V.Sensors, S.Sensors) disposed at the vehicle.

The localization unit 840 may transmit the location information of the vehicle to the processor 830 to match (map) the position of the vehicle identified by using the sensors disposed at the vehicle with the HD map.

The processor 830 may match the position of the vehicle 100 with the HD map based on the location information of the vehicle. In some examples, the localization unit 840 itself may match (map) the current location of the vehicle to a high-precision map based on location information related to the vehicle.

The processor 830 may generate electronic horizon data. The processor 830 may generate horizon path data.

The processor 830 may generate electronic horizon data by reflecting the traveling (driving) situation of the vehicle 100. For example, the processor 830 may generate electronic horizon data based on traveling direction data and traveling speed data of the vehicle 100.

The processor 830 may merge the generated electronic horizon data with previously-generated electronic horizon data. For example, the processor 830 may connect horizon map data generated at a first time point with horizon map data generated at a second time point on the position basis. For example, the processor 830 may connect horizon path data generated at a first time point with horizon path data generated at a second time point on the position basis.

The processor 830 may include a memory, an HD map processing part, a dynamic data processing part, a matching part, and a path generating part.

The HD map processing part may receive HD map data from a server through the TCU. The HD map processing part may store the HD map data. According to an embodiment, the HD map processing part may also process the HD map data. The dynamic data processing part may receive dynamic data from the object detecting device. The dynamic data processing part may receive the dynamic data from a server. The dynamic data processing part may store the dynamic data. In some implementations, the dynamic data processing part may process the dynamic data.

The matching part may receive an HD map from the HD map processing part. The matching part may receive dynamic data from the dynamic data processing part. The matching part may generate horizon map data by matching the HD map data with the dynamic data.

According to an embodiment, the matching part may receive topology data. The matching part may receive ADAS data. The matching part may generate horizon map data by matching the topology data, the ADAS data, the HD map data, and the dynamic data. The path generating part may generate horizon path data. The path generating part may include a main path generator and a sub path generator. The main path generator may generate main path data. The sub path generator may generate sub path data.

A detailed structure of the processor 830 (EHP) will be described later in more detail with reference to FIG. 14.

In addition, the eHorizon system may include a fusion unit 850 for fusing information (data) sensed through the sensors disposed at the vehicle and eHorizon data generated by the eHorizon module (control unit).

For example, the fusion unit 850 may update an HD map by fusing sensing data sensed by the vehicle with an HD map corresponding to eHorizon data, and provide the updated HD map to an ADAS function, an AD (AutoDrive) function, or an ECO function.

For example, the processor 830 may generate/update dynamic information based on the sensing data.

The fusion unit 850 (or the processor 830) may fuse the dynamic information with electronic Horizon data (autonomous driving visibility information for).

In some implementations, the fusion unit 850 may provide the updated HD map even to the infotainment system.

FIG. 8 illustrates that the route provision apparatus 800 merely includes the communication unit 810, the interface unit 820, and the processor 830, but the present disclosure is not limited thereto.

The route provision apparatus 800 of the present disclosure may further include at least one of the localization unit 840 and the fusion unit 850.

In addition, the route provision apparatus 800 (EHP) may further include a navigation system 770.

With such a configuration, when at least one of the localization unit 840, the fusion unit 850, and the navigation system 770 is included in the route provision apparatus 800 (EHP), the functions/operations/controls performed by the included configuration may be understood as being performed by the processor 830.

Figure 9:
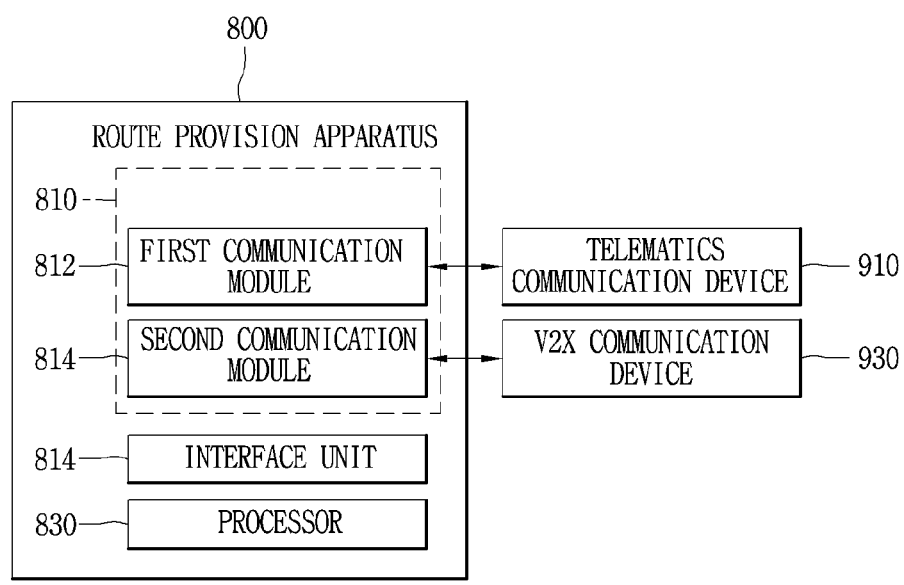
FIG. 9 is a block diagram illustrating an example of the route provision apparatus of FIG. 8 in more detail.

FIG. 9 is a block diagram illustrating an example of the route provision apparatus of FIG. 8 in more detail.

The route provision apparatus refers to a device for providing a route to a vehicle. In other words, the route provision apparatus may generate and output a route for the vehicle to travel, so as to recommend/provide the route to a driver on board the vehicle.

Also, the route provision apparatus may be a device mounted on a vehicle to perform communication through CAN communication and generate messages for controlling the vehicle and/or electric components mounted (or disposed) on the vehicle. Here, the electric components mounted on the vehicle may refer to various parts or components disposed on the vehicle described with reference to FIGS. 1 to 8.

The message may refer to an ADASIS message in which data generated in eHorizon is converted to comply with the ADASIS standard specification.

As another example, the route provision apparatus may be located outside the vehicle, like a server or a communication device, and may perform communication with the vehicle through a mobile communication network. In this case, the route provision apparatus may remotely control the vehicle and/or the electric components mounted on the vehicle using the mobile communication network.

The route provision apparatus 800 is disposed at the vehicle, and may be implemented as an independent device detachable from the vehicle or may be integrally installed on the vehicle to construct a part of the vehicle 100.

Referring to FIG. 9, the path providing device 800 includes a communication unit 810, an interface unit 820, and a processor 830.

The communication unit 810 may be configured to perform communications with various components disposed at the vehicle.

For example, the communication unit 810 may receive various information provided through a controller area network (CAN).

The communication unit 810 may include a first communication module 812, and the first communication module 812 may receive an HD map provided through telematics. In other words, the first communication module 812 may be configured to perform 'telematics communication'. The first communication module 812 performing the telematics communication may perform communication with a server and the like by using a satellite navigation system or a base station provided by mobile communication such as 4G or 5G.

The first communication module 812 may perform communication with a telematics communication device 910. The telematics communication device may include a server provided by a portal provider, a vehicle provider and/or a mobile communication company.

The processor 830 of the path providing device 800 may determine absolute coordinates of road-related information (event information) based on ADAS MAP received from an external server (eHorizon) through the first communication module 812. In addition, the processor 830 may autonomously drive the vehicle or perform a vehicle control using the absolute coordinates of the road-related information (event information).

The communication unit 810 may include a second communication module 814, and the second communication module 814 may receive various types of information provided through vehicle to everything (V2X) communication. In other words, the second communication module 814 is configured to perform 'V2X communication'. The V2X communication may be defined as a technology of exchanging or sharing information, such as traffic condition and the like, while communicating with road infrastructures and other vehicles during driving.

The second communication module 814 may perform communication with a V2X communication device 930. The V2X communication device may include a mobile terminal belonging to a pedestrian or a person riding a bike, a fixed terminal installed on a road, another vehicle, and the like.

Here, the another vehicle may denote at least one of vehicles existing within a predetermined distance from the vehicle 100 or vehicles approaching by a predetermined distance or shorter with respect to the vehicle 100.

The present disclosure may not be limited thereto, and the another vehicle may include all the vehicles capable of performing communication with the communication unit 810. According to this specification, for the sake of explanation, an example will be described in which the another vehicle is at least one vehicle existing within a predetermined distance from the vehicle 100 or at least one vehicle approaching by a predetermined distance or shorter with respect to the vehicle 100.

The predetermined distance may be determined based on a distance capable of performing communication through the communication unit 810, determined according to a specification of a product, or determined/varied based on a user's setting or V2X communication standard.

The second communication unit 814 may be configured to receive LDM data from another vehicle. The LDM data may be a V2X message (BSM, CAM, DENM, etc.) transmitted and received between vehicles through V2X communication.

The LDM data may include location information related to the another vehicle.

The processor 830 may determine a position of the vehicle of the present disclosure relative to the another vehicle, based on the location information related to the vehicle 100 and the location information related to the another vehicle included in the LDM data received through the second communication module 814.

In addition, the LDM data may include speed information of another vehicle. The processor 830 may also determine a relative speed of the another vehicle using speed information of the vehicle of the present disclosure and the speed information of the another vehicle. The speed information of the vehicle may be calculated using a degree to which the location information of the vehicle received through the communication unit 810 changes over time or calculated based on information received from the driving control apparatus 500 or the power train operating unit 610 of the vehicle 100.

The second communication module 814 may be the V2X communication unit 430 described above.

If the communication unit 810 is a component that performs communication with a device located outside the vehicle 100 using wireless communication, the interface unit 820 is a component performing communication with a device located inside the vehicle 100 using wired or wireless communication.

The interface unit 820 may receive information related to driving of the vehicle from most of electric components provided in the vehicle 100. Information transmitted from the electric component disposed at the vehicle to the route provision apparatus 800 is referred to as 'vehicle driving information (or vehicle travel information)'.

For example, when the electric component is a sensor, the vehicle driving information may be sensing information sensed by the sensor.

Vehicle driving information includes vehicle information and surrounding information related to the vehicle. Information related to an inside of the vehicle with respect to a frame of the vehicle 100 may be defined as the vehicle information, and information related to an outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. For example, the surrounding information of the vehicle may be a state of a road surface on which the vehicle is traveling (e.g., a frictional force), the weather, a distance from a preceding (succeeding) vehicle, a relative speed of a preceding (succeeding) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may also include ambient brightness, temperature, a position of the sun, information related to a nearby subject (a person, another vehicle, a sign, etc.), a type of a driving road surface, a landmark, line information, and driving lane information, and information for an autonomous travel/autonomous parking/automatic parking/manual parking mode.

In addition, the surrounding information may further include a distance from an object existing around the vehicle to the vehicle, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components disposed at the vehicle.

Meanwhile, the processor 830 is configured to control one or more electric components provided in the vehicle using the interface unit 820.

Specifically, the processor 830 may determine whether or not at least one of a plurality of preset conditions is satisfied, based on vehicle driving information received through the communication unit 810. According to a satisfied condition, the processor 830 may control the one or more electric components in different ways.

In connection with the preset conditions, the processor 830 may detect an occurrence of an event in an electric component provided in the vehicle and/or application, and determine whether the detected event meets a preset condition. At this time, the processor 830 may also detect the occurrence of the event from information received through the communication unit 810.

The application is a concept including a widget, a home launcher, and the like, and refers to all types of programs that can be run on the vehicle. Accordingly, the application may be a program that performs various functions, such as a web browser, a video playback, message transmission/reception, schedule management, or application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be an occurrence of forward collision warning, an occurrence of a blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various electronic control units (ECUs) provided in the vehicle perform specific functions, it may be determined as the occurrence of the event.

For example, when a generated event satisfies the preset condition, the processor 830 may control the interface unit 820 to display information corresponding to the satisfied condition on one or more displays provided in the vehicle.

Figure 10:
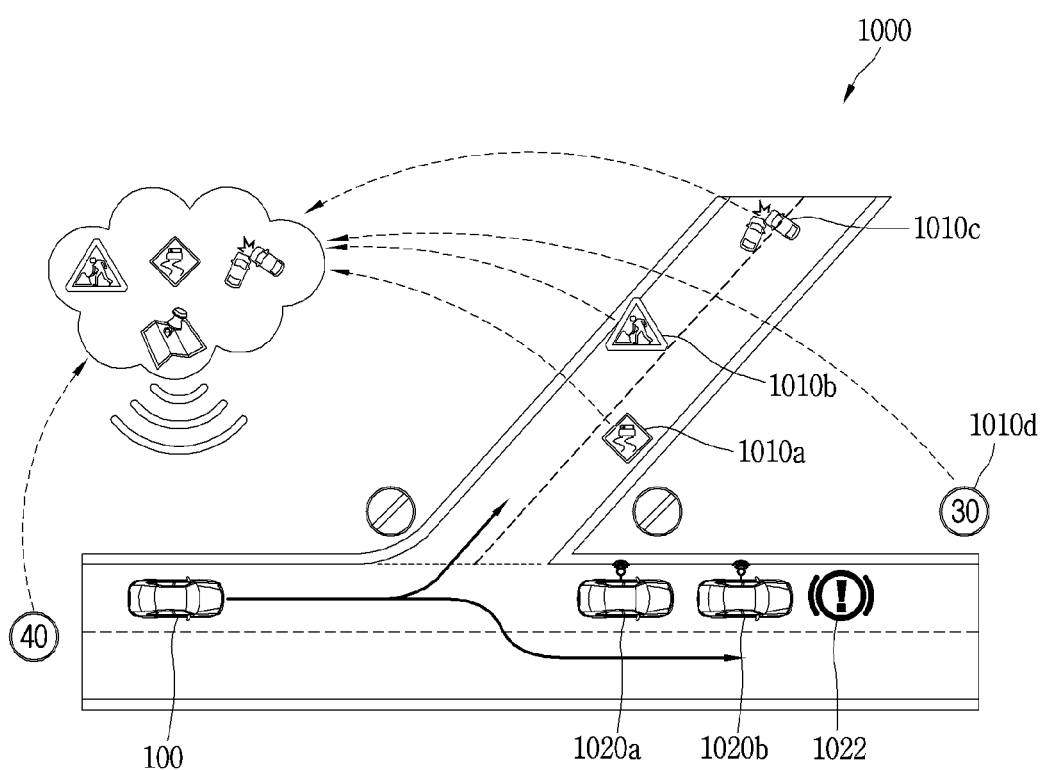
FIG. 10 is a diagram illustrating an example of eHorizon.

FIG. 10 is a diagram illustrating an example of eHorizon.

Referring to FIG. 10, the route provision apparatus 800 may autonomously drive the vehicle 100 on the basis of eHorizon.

eHorizon may be classified into categories such as software, a system, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems.

For an example, eHorizon may refer to an external server (a cloud or a cloud server).

In other words, eHorizon may perform the role of transferring a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The route provision apparatus 100 may use information, which is received from eHorizon, in the autonomous driving system and/or the infotainment system.

For example, the autonomous driving system may be divided into a safety aspect and an ECO aspect.

In terms of the safety aspect, the route provision apparatus 800 may perform an Advanced Driver Assistance System (ADAS) function such as Lane Keeping Assist (LKA), Traffic Jam Assist (TJA) or the like, and/or an AD (Auto-Drive) function such as passing, road joining, lane change or the like, by using road shape information and event information received from eHorizon and surrounding object information sensed through the sensing unit disposed at the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect.

For an example, the route provision apparatus 800 may receive accident information, road surface condition information, and the like on a front road from eHorizon to output them on a display unit (for example, HUD (Head Up Display), CID, Cluster, etc.) provided in the vehicle, so as to provide guidance information for allowing the driver to perform safe driving.

Referring to FIG. 10, the eHorizon (external server) may receive location information related to various types of event information (e.g., road surface condition information 1010*a*, construction information 1010*b*, accident information 1010*c*, etc.) occurred on roads and/or road-based speed limit information 1010*d* from the vehicle 100 or other vehicles 1020*a* and 1020*b* or may collect such information from infrastructures (for example, measuring devices, sensing devices, cameras, etc.) installed on the roads.

In addition, the event information and the road-based speed limit information may be linked to map information or may be updated.

In addition, the location information related to the event information may be divided into lane units.

By using such information, the eHorizon (external server) of the present invention can provide information necessary for an autonomous driving system and an infotainment system to each vehicle based on a detailed map capable of determining a road situation (or road information) in the lane unit.

In other words, the eHorizon (external server) of the present disclosure may provide an absolute highly-detailed map using an absolute coordinate of road-related information (for example, event information, location information of the vehicle 100, etc.) based on a detailed map.

The road-related information provided by the eHorizon may be information corresponding to a predetermined region (predetermined space) with respect to the vehicle 100.

In some implementations, the route provision apparatus may acquire location information related to another vehicle through communication with the another vehicle.

Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the foregoing ADAS MAP in the data format and transmission method. For example, the ADAS MAP may correspond to a high-definition map having absolute coordinates received from eHorizon (external server), and the LDM may denote a high-definition map having relative coordinates based on data transmitted and received through V2X communication.

The LDM data (or LDM information) denotes data mutually transmitted and received in V2X communication (vehicle to everything) (for example, V2V (Vehicle to Vehicle) communication, V2I (Vehicle to Infra) communication, V2P (Vehicle to Pedestrian) communication).

The LDM may be implemented, for example, by a storage for storing data transmitted and received through V2X communication, and the LDM may be formed (stored) in a vehicle control device provided in each vehicle.

The LDM data may denote data exchanged between a vehicle and a vehicle (infrastructure, pedestrian) or the like, for an example. The LDM data may include a Basic Safety Message (BSM), a Cooperative Awareness Message (CAM), and a Decentralized Environmental Notification message (DENM), and the like, for example.

The LDM data may be referred to as a V2X message or an LDM message, for example.

The vehicle control device associated with the present disclosure may efficiently manage LDM data (or V2X messages) efficiently transmitted and received between vehicles using the LDM.

Based on LDM data received via V2X communication, the LDM may store, distribute to another vehicle, and continuously update all relevant information (for example, a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For example, a V2X application provided in the path providing device 800 registers in the LDM, and receives a specific message such as all the DENMs in addition to a warning about a failed vehicle. Then, the LDM may automatically assign the received information to the V2X application, and the V2X application may control the vehicle based on the information assigned from the LDM.

As described above, the vehicle of the present disclosure may control the vehicle using the LDM formed by the LDM data collected through V2X communication.

The LDM may provide road-related information to the vehicle control device. The road-related information provided by the LDM provides only a relative distance and a relative speed with respect to another vehicle (or an event generation point), other than map information having absolute coordinates.

In other words, the vehicle of the present disclosure may perform autonomous driving using an ADAS MAP (absolute coordinates HD map) according to the ADASIS standard provided by eHorizon, but the map may be used only to determine a road condition in a surrounding area of the vehicle.

In addition, the vehicle may perform autonomous driving using an LDM (relative coordinates HD map) formed by LDM data received through V2X communication, but there is a limitation in that accuracy is inferior due to insufficient absolute location information.

The vehicle control device included in the vehicle may generate a fused definition map using the ADAS MAP received from the eHorizon and the LDM data received through the V2X communication, and control (autonomously drive) the vehicle in an optimized manner using the fused definition map.

Figure 11A:
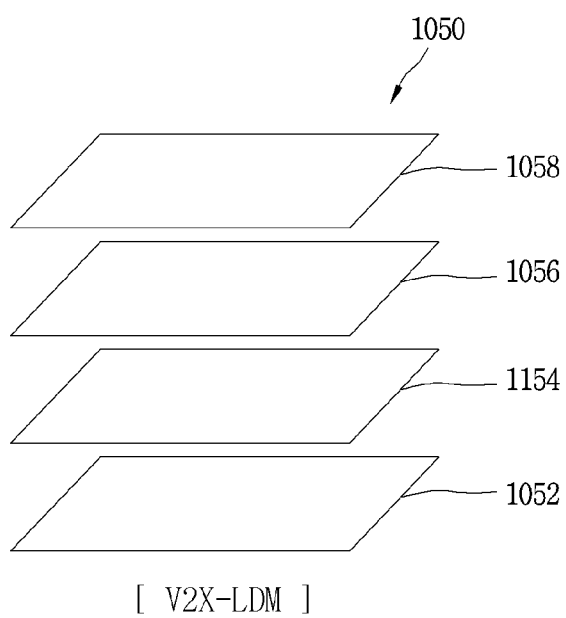
FIGS. 11A and 11B are diagrams illustrating examples of a Local Dynamic Map (LDM) and an Advanced Driver Assistance System (ADAS) MAP.
Figure 11B:
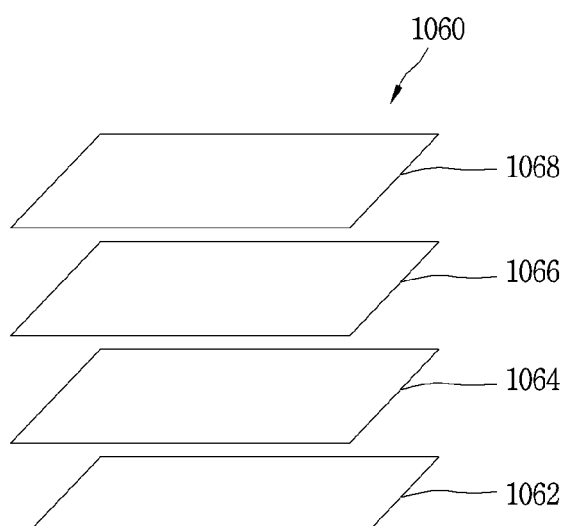

FIG. 11A illustrates an example of a data format of LDM data (or LDM) transmitted and received between vehicles via V2X communication, and FIG. 11B illustrates an example of a data format of an ADAS MAP received from an external server (eHorizon).

Referring to FIG. 11A, the LDM data (or LDM) 1050 may be formed to have four layers.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (for example, specific place information specified by a maker among a plurality of place information included in the map information) among information associated with road. The landmark information may include location information, name information, size information, and the like.

The third layer 1056 may include traffic situation related information (for example, traffic light information, construction information, accident information, etc.) among information associated with roads. The construction information and the accident information may include location information.

The fourth layer 1058 may include dynamic information (for example, object information, pedestrian information, other vehicle information, etc.) among the road-related information. The object information, pedestrian information, and other vehicle information may include location information.

In other words, the LDM data 1050 may include information sensed through a sensing unit of another vehicle or information sensed through a sensing unit of the vehicle, and may include road-related information that is transformed in real time as it goes from the first layer to the fourth layer.

Referring to FIG. 11B, the ADAS MAP may be formed to have four layers similar to the LDM data.

The ADAS MAP 1060 may denote data received from eHorizon and formed to conform to the ADASIS specification.

The ADAS MAP 1060 may include a first layer 1062 to a fourth layer 1068.

The first layer 1062 may include topology information. The topology information is, for example, information that explicitly defines a spatial relationship, and may refer to map information.

The second layer 1064 may include landmark information (for example, specific place information specified by a maker among a plurality of place information included in the map information) among information associated with the road. The landmark information may include location information, name information, size information, and the like.

The third layer 1066 may include highly detailed map information. The highly detailed MAP information may be referred to as an HD-MAP, and road-related information (for example, traffic light information, construction information, accident information) may be recorded in the lane unit. The construction information and the accident information may include location information.

The fourth layer 1068 may include dynamic information (for example, object information, pedestrian information, other vehicle information, etc.). The object information, pedestrian information, and other vehicle information may include location information.

In other words, the ADAS MAP 1060 may include road-related information that is transformed in real time as it goes from the first layer to the fourth layer, similarly to the LDM data 1050.

The processor 830 may autonomously drive the vehicle 100.

For example, the processor 830 may autonomously drive the vehicle 100 based on vehicle driving information sensed through various electric components provided in the vehicle 100 and information received through the communication unit 810.

Specifically, the processor 830 may control the communication unit 810 to acquire the location information of the vehicle. For example, the processor 830 may acquire the location information (location coordinates) of the vehicle 100 through the location information unit 420 of the communication unit 810.

Furthermore, the processor 830 may control the first communication module 812 of the communication unit 810 to receive map information from an external server. Here, the first communication module 812 may receive ADAS MAP from the external server (eHorizon). The map information may be included in the ADAS MAP.

In addition, the processor 830 may control the second communication module 814 of the communication unit 810 to receive location information of another vehicle from the another vehicle. Here, the second communication module 814 may receive LDM data from the another vehicle. The location information of the another vehicle may be included in the LDM data.

The another vehicle denotes a vehicle existing within a predetermined distance from the vehicle, and the predetermined distance may be a communication-available distance of the communication unit 810 or a distance set by a user.

The processor 830 may control the communication unit to receive the map information from the external server and the location information of the another vehicle from the another vehicle.

Furthermore, the processor 830 may fuse the acquired location information of the vehicle and the received location information of the another vehicle into the received map information, and control the vehicle 100 based on at least one of the fused map information and vehicle-related information sensed through the sensing unit 840.

Here, the map information received from the external server may denote high-definition map information (HD-MAP) included in the ADAS MAP. The high-definition map information may be recorded with road-related information in the lane unit.

The processor 830 may fuse the location information of the vehicle 100 and the location information of the another vehicle into the map information in units of lanes. In addition, the processor 830 may fuse the road-related information received from the external server and the road-related information received from the another vehicle into the map information in the lane unit.

The processor 830 may generate ADAS MAP required for the control of the vehicle using the ADAS MAP received from the external server and the vehicle-related information received through the sensing unit 840.

Specifically, the processor 830 may apply the vehicle-related information sensed within a predetermined range through the sensing unit 840 to the map information received from the external server.

Here, the predetermined range may be an available distance which can be sensed by an electric component provided in the vehicle 100 or may be a distance set by a user.

The processor 830 may control the vehicle by applying the vehicle-related information sensed within the predetermined range through the sensing unit to the map information and then additionally fusing the location information of the another vehicle thereto.

In other words, when the vehicle-related information sensed within the predetermined range through the sensing unit is applied to the map information, the processor 830 may use only the information within the predetermined range from the vehicle, and thus a range capable of controlling the vehicle may be local.

However, the location information of another vehicle received through the V2X module may be received from the another vehicle existing in a space out of the predetermined range. It may be because the communication-available distance of the V2X module communicating with the another vehicle through the V2X module is farther than a predetermined range of the sensing unit 840.

As a result, the processor 830 may fuse the location information of the another vehicle included in the LDM data received through the second communication module 814 into the map information on which the vehicle-related information has been sensed, so as to acquire the location information of the another vehicle existing in a broader range and more effectively control the vehicle using the acquired information.

For example, it is assumed that a plurality of other vehicles is crowded ahead in a lane in which the vehicle exists, and it is also assumed that the sensing unit may sense only location information related to an immediately preceding vehicle.

In this case, when only vehicle-related information sensed within a predetermined range on map information is used, the processor 830 may generate a control command for controlling the vehicle such that the vehicle overtakes the preceding vehicle.

However, a plurality of other vehicles may actually exist ahead, which may make the vehicle difficult to overtake other vehicles.

At this time, the present disclosure may acquire the location information of another vehicle received through the V2X module. At this time, the received location information of the another vehicle may include location information of not only a vehicle immediately in front of the vehicle 100 but also a plurality of other vehicles in front of the preceding vehicle.

The processor 830 may additionally merge the location information of the plurality of other vehicles acquired through the V2X module to map information to which information associated with the vehicle is applied, to determine that it is in an inappropriate situation to pass and cut in the preceding vehicle.

With such configuration, the present disclosure may overcome the related art technical limitation that only vehicle-related information acquired through the sensing unit 840 is merely fused to high-definition map information and thus autonomous driving is enabled only within a predetermined range. In other words, the present disclosure may achieve more accurate and stable vehicle control by additionally fusing information related to other vehicles (e.g., speeds, locations of other vehicles), which have been received from the other vehicles located at a farther distance than the predetermined range through the V2X module, as well as vehicle-related information sensed through the sensing unit, into map information.

Vehicle control described herein may include at least one of autonomously driving the vehicle 100 and outputting a warning message associated with the driving of the vehicle.

Hereinafter, description will be given in more detail of a method in which a processor controls a vehicle using LDM data received through a V2X module, ADAS MAP received from an external server (eHorizon), and vehicle-related information sensed through a sensing unit disposed at the vehicle, with reference to the accompanying drawings.

Figure 12A:
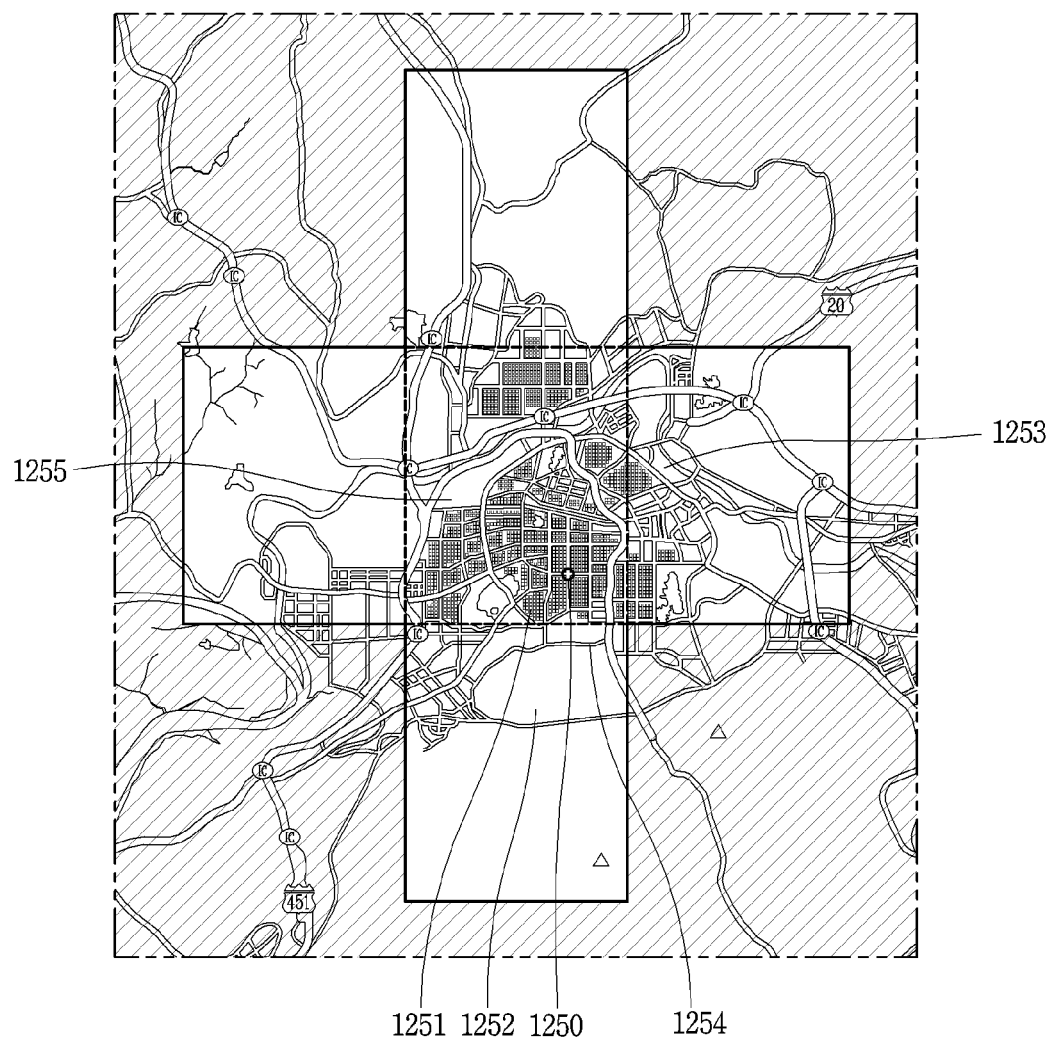
FIGS. 12A and 12B are diagrams illustrating examples of receiving high-definition map data by a route provision apparatus.
Figure 12B:
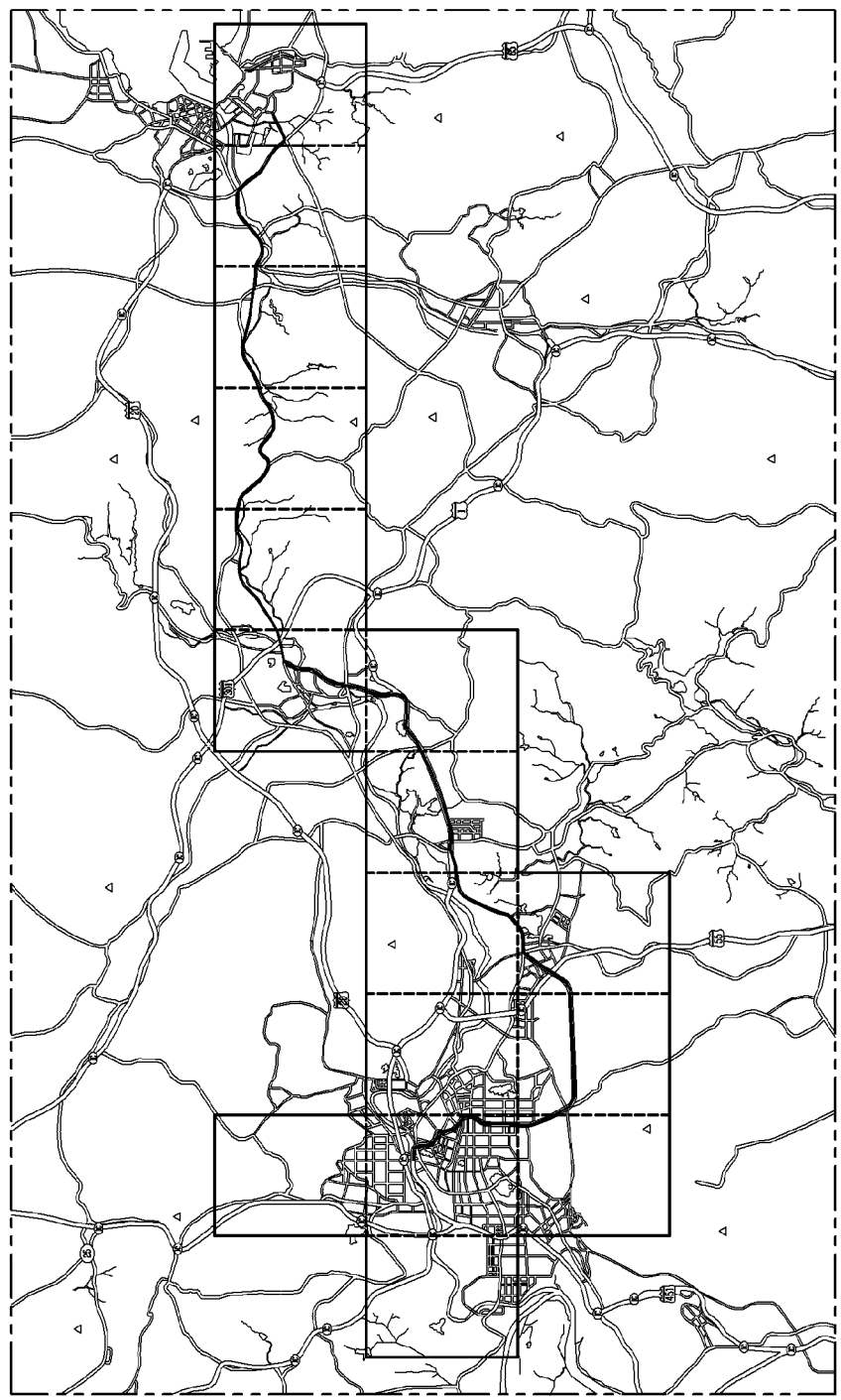

FIGS. 12A and 12B are exemplary views illustrating a method in which a communication device (or TCU) receives high-definition map data.

The server may divide HD map data into tile units and provide them to the route provision apparatus 800. The processor 830 may receive HD map data in the tile units from the server or another vehicle through the communication unit 810. Hereinafter, HD map data received in tile units is referred to as 'HD map tile' or 'map information in units of tiles'.

The HD map data is divided into tiles having a predetermined shape, and each tile corresponds to a different portion of the map. When connecting all the tiles, the full HD map data is acquired. Since the HD map data has a high capacity, the vehicle 100 may be provided with a high-capacity memory in order to download and use the full HD map data. As communication technologies are developed, it is more efficient to download, use, and delete HD map data in tile units, rather than to provide the high-capacity memory in the vehicle 100.

In the present disclosure, for the convenience of description, a case in which the predetermined shape is rectangular is described as an example, but the predetermined shape may be modified to various polygonal shapes.

The processor 830 may store the downloaded HD map tile in the memory 140. Also, when a storage unit (or cache memory) is provided in the route provision apparatus, the processor 830 may store (or temporarily store) the downloaded HD map tile in the storage unit provided in the route provision apparatus.

The processor 830 may delete the stored HD map tile. For example, the processor 830 may delete the HD map tile when the vehicle 100 leaves an area corresponding to the HD map tile. For example, the processor 830 may delete the HD map tile when a preset time elapses after storage.

As illustrated in FIG. 12A, when there is no preset destination, the processor 830 may receive a first HD map tile 1251 including a location (position) 1250 of the vehicle 100. The server receives data of the location 1250 of the vehicle 100 from the vehicle 100, and transmits the first HD map tile 1251 including the location 1250 of the vehicle 100 to the vehicle 100. In addition, the processor 830 may receive HD map tiles 1252, 1253, 1254, and 1255 around the first HD map tile 1251. For example, the processor 830 may receive the HD map tiles 1252, 1253, 1254, and 1255 that are adjacent to top, bottom, left, and right sides of the first HD map tile 1251, respectively. In this case, the processor 830 may receive a total of five HD map tiles. For example, the processor 830 may further receive HD map tiles located in a diagonal direction, together with the HD map tiles 1252, 1253, 1254, and 1255 adjacent to the top, bottom, left, and right sides of the first HD map tile 1251. In this case, the processor 830 may receive a total of nine HD map tiles.

As illustrated in FIG. 12B, when there is a preset destination, the processor 830 may receive tiles associated with a path from the location 1250 of the vehicle 100 to the destination. The processor 830 may receive a plurality of tiles to cover the path.

The processor 830 may receive all the tiles covering the path at one time.

Alternatively, the processor 830 may receive the entire tiles in a dividing manner while the vehicle 100 travels along the path. The processor 830 may receive only at least some of the entire tiles based on the location of the vehicle 100 while the vehicle 100 travels along the path. Thereafter, the processor 830 may continuously receive tiles during the travel of the vehicle 100 and delete the previously received tiles.

The processor 830 may generate electronic horizon data based on the HD map data.

The vehicle 100 may travel in a state where a final destination is set. The final destination may be set based on a user input received via the user interface device 200 or the communication apparatus 400. In some implementations, the final destination may be set by the driving system 710.

In the state where the final destination is set, the vehicle 100 may be located within a preset distance from a first point during driving. When the vehicle 100 is located within the preset distance from the first point, the processor 830 may generate electronic horizon data having the first point as a start point and a second point as an end point. The first point and the second point may be points on the path heading to the final destination. The first point may be described as a point where the vehicle 100 is located or will be located in the near future. The second point may be described as the horizon described above.

The processor 830 may receive an HD map of an area including a section from the first point to the second point. For example, the processor 830 may request an HD map for an area within a predetermined radial distance from the section between the first point and the second point and receive the requested HD map.

The processor 830 may generate electronic horizon data for the area including the section from the first point to the second point, based on the HD map. The processor 830 may generate horizon map data for the area including the section from the first point to the second point. The processor 830 may generate horizon path data for the area including the section from the first point to the second point. The processor 830 may generate a main path for the area including the section from the first point to the second point. The processor 830 may generate data of a sub path for the area including the section from the first point to the second point.

When the vehicle 100 is located within a preset distance from the second point, the processor 830 may generate electronic horizon data having the second point as a start point and a third point as an end point. The second point and the third point may be points on the path heading to the final destination. The second point may be described as a point where the vehicle 100 is located or will be located in the near future. The third point may be described as the horizon described above. Meanwhile, the electronic horizon data having the second point as the start point and the third point as the end point may be geographically connected to the electronic horizon data having the first point as the start point and the second point as the end point.

The operation of generating the electronic horizon data using the second point as the start point and the third point as the end point may be performed by correspondingly applying the operation of generating the electronic horizon data having the first point as the start point and the second point as the end point.

In some implementations, the vehicle 100 may travel even when the final destination is not set.

Figure 13:
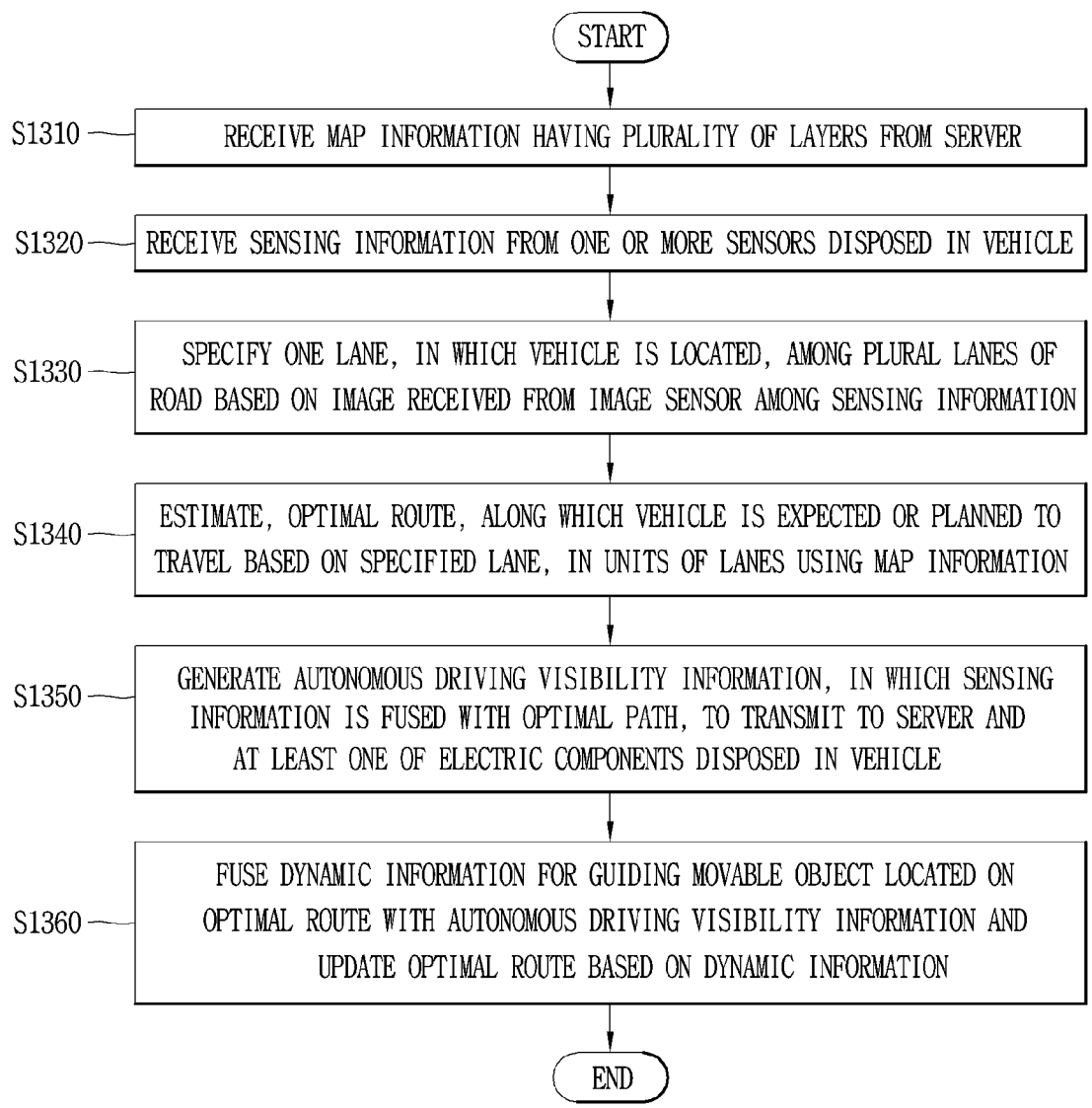
FIG. 13 is a flowchart illustrating an exemplary method by which the route provision apparatus generates autonomous driving visibility information by receiving a high-definition map.

FIG. 13 is a flowchart illustrating an example of a path providing method of the path providing device of FIG. 9.

The processor 830 receives a high-definition (HD) map from an external server. In detail, the processor 830 may receive map information (HD map) having a plurality of layers from a server (external server or cloud server) (S1310).

The external server is a device capable of performing communication through the first communication module 812 and is an example of the telematics communication device 910. The high-definition map is provided with a plurality of layers. The HD map is ADAS MAP and may include at least one of the four layers described above with reference to FIG. 11B.

The map information may include the horizon map data described above. The horizon map data may refer to an ADAS MAP (or LDM MAP) or HD MAP data including a plurality of layers of data while satisfying the ADASIS standard described with respect to FIG. 11B.

In addition, the processor 830 of the route provision apparatus may receive sensing information from one or more sensors disposed at the vehicle (S1320). The sensing information may mean information sensed (or information processed after being sensed) by each sensor. The sensing information may include various information according to types of data that can be sensed by the sensors.

The processor 830 may specify (determine) one lane in which the vehicle 100 is located on a road having a plurality of lanes based on an image that has been received from an image sensor among the sensing information (S1330). Here, the lane refers to a lane in which the vehicle 100 having the route provision apparatus 800 is currently traveling.

The processor 830 may determine a lane in which the vehicle 100 having the route provision apparatus 800 is currently moving by using (analyzing) an image received from an image sensor (or camera) among the sensors.

In addition, the processor 830 may estimate an optimal route (or route), in which the vehicle 100 is expected or planned to be driven based on the determined lane, in units of lanes using map information (S1340). Here, the optimal route may refer to the horizon pass data or main path, as described above. The present disclosure is not limited to this, and the optimal route may further include sub paths. Here, the optimal route may be referred to as a Most Preferred Path or Most Probable Path, and may be abbreviated as MPP.

That is, the processor 830 may predict or plan an optimal route, in which the vehicle 100 may travel to a destination, based on a specific lane, in which the vehicle 100 is currently driving, in units of lanes using map information.

The processor 830 may generate autonomous driving visibility information in which sensing information is fused with the optimal route to transmit it to a server and at least one of electric components (or electric parts) disposed at the vehicle (S1350).

Here, the autonomous driving visibility information may mean eHorizon information (or eHorizon data) described above. The autonomous driving visibility information (eHorizon information) is information (data, or environment) which the vehicle 100 uses for performing autonomous driving in units of lanes, namely, as illustrated in FIG. 10, may refer to autonomous driving environment data in which every information (map information, vehicles, objects, moving objects, environment, weather, etc.) within a predetermined range based on a road including an optimal route in which the vehicle 100 is to move or based on the optimal route is fused together. The autonomous driving environment data may refer to data (or overall data environment) based on which the processor 830 of the vehicle 100 autonomously drives the vehicle 100 or calculates an optimal route of the vehicle 100.

In some implementations, the autonomous driving visibility information may also mean information for guiding a driving path in units of lanes. This is information in which at least one of sensing information and dynamic information is fused with the optimal route, and may be information for guiding a path along which the vehicle is to finally move in units of lanes.

When autonomous driving visibility information refers to information for guiding a driving path in units of lanes, the processor 830 may generate different autonomous driving visibility information depending on whether a destination has been set in the vehicle 100.

For example, when a destination has been set in the vehicle 100, the processor 830 may generate autonomous driving visibility information for guiding a driving path (travel path) to the destination in units of lanes.

As another example, when a destination has not been set in the vehicle 100, the processor 830 may calculate a main path (Most Preferred Path (MPP)) along which the vehicle 100 is most likely to travel, and generate autonomous driving visibility information for guiding the main path (MPP) in units of lanes. In this case, the autonomous driving visibility information may further include sub route information related to sub paths, which are branched from the main path (MPP) and along which the vehicle 100 is likely to travel with a higher probability than a predetermined reference.

The autonomous driving visibility information may provide a traveling route (driving path) up to a destination for each lane drawn on a road, thereby providing more precise and detailed route information. The autonomous driving visibility information may be route information that complies with the standard of ADASIS v3.

The processor 830 may merge dynamic information related to a movable object located on the optimal route with the autonomous driving visibility information, and update the optimal route based on the dynamic information (S1360). The dynamic information may be included in the map information received from the server and may be information included in any one (e.g., fourth layer 1068) of a plurality of layers.

The electric component disposed at the vehicle may be at least one of various components disposed at the vehicle, and may include, for example, a sensor, a lamp, and the like. The electric component disposed at the vehicle may be referred to as an eHorizon Receiver (EHR) in terms of receiving an ADASIS message including autonomous driving visibility information from the processor 830.

The processor 830 according to the present disclosure may be referred to as an eHorizon Provider (EHP) in terms of providing (transmitting) an ADASIS Message including autonomous driving visibility information.

The ADASIS message including the autonomous driving visibility information may be a message in which the autonomous driving visibility information is converted to comply with the ADASIS standard specification.

The foregoing description will be summarized as follows.

The processor 830 may generate autonomous driving visibility information for guiding a road located ahead of the vehicle in units of lanes using the HD map.

The processor 830 may receive sensing information from one or more sensors disposed at the vehicle 100 through the interface unit 820. The sensing information may be vehicle driving information.

The processor 830 may identify one lane in which the vehicle 100 is located on a road made up of a plurality of lanes based on an image, which has been received from an image sensor, among the sensing information. For example, when the vehicle 100 is moving in a first lane on an eight-lane road, the processor 830 may identify the first lane as a lane in which the vehicle 100 is located, based on the image received from the image sensor.

The processor 830 may estimate an optimal route, in which the vehicle 100 is expected or planned to move based on the identified lane, in units of lanes using the map information.

Here, the optimal route may be referred to as a Most Preferred Path or Most Probable Path, and may be abbreviated as MPP.

The vehicle 100 may autonomously travel along the optimal route. When traveling manually, the vehicle 100 may provide navigation information to guide the optimal route to a driver.

The processor 830 may generate autonomous driving visibility information, in which the sensing information is merged with the optimal route. The autonomous driving visibility information may be referred to as "eHorizon" or "electronic horizon" or "electronic horizon data" or an "ADASIS message" or a "field-of-view information tree graph."

The processor 830 may use the autonomous driving visibility information differently depending on whether a destination has been set in the vehicle 100.

For example, when a destination is set in the vehicle 100, the processor 830 may generate an optimal route for guiding a driving path up to the destination in units of lanes using the autonomous driving visibility information.

As another example, when a destination has not been set in the vehicle 100, the processor 830 may calculate a main path, along which the vehicle 100 is most likely to travel, in units of lanes using the autonomous driving visibility information. In this case, the autonomous driving visibility information may further include sub route information related to sub paths, which are branched from the main path (MPP) and along which the vehicle 100 is likely to travel with a higher probability than a predetermined reference.

The autonomous driving visibility information may provide a driving path up to a destination for each lane indicated on a road, thereby providing more precise and detailed route information. The route information may be route information that complies with the standard of ADASIS v3.

The autonomous driving visibility information may be provided by subdividing a path in which the vehicle must drive or can travel, in units of lanes. The autonomous driving visibility information may include information for guiding a driving path to a destination in units of lanes. When the autonomous driving visibility information is displayed on a display mounted on the vehicle 100, guide lines for guiding lanes that can be driven on a map, and information within a predetermined range (e.g., roads, Landmarks, other vehicles, surrounding objects, weather information, etc.) based on the vehicle 100 may be displayed. In addition, a graphic object indicating the position of the vehicle 100 may be included on at least one lane in which the vehicle 100 is located among a plurality of lanes included in a map.

The autonomous driving visibility information may be fused with dynamic information related to a movable object located on the optimal route. The dynamic information may be received by the processor 830 through the communication unit 810 and/or the interface unit 820, and the processor 830 may update the optimal route based on the dynamic information. As the optimal route is updated, the autonomous driving visibility information is also updated.

The dynamic information may include dynamic data.

The processor 830 may provide the autonomous driving visibility information to at least one electric component disposed at the vehicle. In addition, the processor 830 may also provide the autonomous driving visibility information to various applications installed in the systems of the vehicle 100.

The electric component refers to any device mounted on the vehicle 100 and capable of performing communication, and may include the components 120 to 700 described above with reference to FIGS. 1 to 9 (e.g., those components described above with reference to FIG. 7). For example, the object detecting apparatus 300 such as a radar or a LiDAR, the navigation system 770, the vehicle operating apparatus 600, and the like may be included in the electric components.

In addition, the electric component may further include an application executable in the processor 830 or a module that executes the application.

The electric component may perform its own function based on the autonomous driving visibility information.

The autonomous driving visibility information may include a path in units of lanes and a position or location of the vehicle 100, and may include dynamic information including at least one object to be sensed by the electric component. The electric component may reallocate resources to sense an object corresponding to the dynamic information, determine whether the dynamic information matches sensing information sensed by the electric component itself, or change a setting value for generating sensing information.

The autonomous driving visibility information may include a plurality of layers, and the processor 830 may selectively transmit at least one of the layers according to an electric component that receives the autonomous driving visibility information.

Specifically, the processor 830 may select at least one of a plurality of layers included in the autonomous driving visibility information, based on at least one of a function being executed by the electrical component or a function scheduled to be executed. In addition, the processor 830 may transmit the selected layer to the electronic component, but the unselected layer may not be transmitted to the electrical component.

The processor 830 may receive external information generated by an external device from the external device located within a predetermined range with respect to the vehicle.

The predetermined range is a distance at which the second communication module 814 can perform communication, and may vary according to the performance of the second communication module 814. When the second communication module 814 performs V2X communication, a V2X communication-available range may be defined as the predetermined range.

Furthermore, the predetermined range may vary according to an absolute speed of the vehicle 100 and/or a relative speed with the external device.

The processor 830 may determine the predetermined range based on the absolute speed of the vehicle 100 and/or the relative speed with the external device, and permit the communication with external devices located within the determined predetermined range.

Specifically, external devices capable of communicating through the second communication module 814 may be classified into a first group or a second group based on the absolute speed of the vehicle 100 and/or the relative speed with respect to the external device. External information received from external devices included in the first group is used to generate dynamic information, which will be described below, but external information received from external devices included in the second group is not used to generate the dynamic information. Even when external information is received from the external devices included in the second group, the processor 830 ignores the external information.

The processor 830 may generate dynamic information related to an object to be sensed by at least one electric component disposed at the vehicle based on the external information, and match the dynamic information with the autonomous driving visibility information.

For example, the dynamic information may correspond to the fourth layer described above with reference to FIGS. 11A and 11B.

As described above with reference to FIGS. 11A and 11B, the route provision apparatus 800 may receive the ADAS MAP and/or the LDM data. Specifically, the route provision apparatus 800 may receive the ADAS MAP from the telematics communication device 910 through the first communication module 812, and the LDM data from the V2X communication device 930 through the second communication module 814.

The ADAS MAP and the LDM data may be provided with a plurality of layers having the same format. The processor 830 may select at least one layer from the ADAS MAP, select at least one layer from the LDM data, and generate the autonomous driving visibility information including the selected layers.

For example, after selecting first to third layers of the ADAS MAP and selecting a fourth layer of the LDM data, one autonomous driving visibility information may be generated by aligning those four layers into one. In this case, the processor 830 may transmit a refusal message for refusing the transmission of the fourth layer to the telematics communication device 910. This is because receiving partial information excluding the fourth layer uses less resources of the first communication module 812 than receiving all information including the fourth layer. By matching part of the ADAS MAP with part of the LDM data, complementary information can be utilized.

In some examples, after selecting the first to fourth layers of the ADAS MAP and selecting the fourth layer of the LDM data, one autonomous driving visibility information may be generated by aligning those five layers into one. In this case, priority may be given to the fourth layer of the LDM data.

If the fourth layer of the ADMS MAP includes information which does not match the fourth layer of the LDM data, the processor 830 may delete the mismatched information or correct the mismatched information based on the LDM data.

The dynamic information may be object information related to a predetermined object. For example, the dynamic information may include at least one of position coordinates for guiding the position of the predetermined object, and information guiding the shape, size, and kind of the predetermined object.

The predetermined object may refer to an object that disturbs driving in a corresponding lane among objects that can be driven on a road.

For example, the predetermined object may include a bus stopped at a bus stop, a taxi stopped at a taxi stand or a truck from which articles are being unloaded.

As another example, the predetermined object may include a garbage truck that travels at a predetermined speed or slower or a large-sized vehicle (e.g., a truck or a container truck, etc.) that is determined to obstruct a driver's vision.

As another example, the predetermined object may include an object informing of an accident, road damage or construction.

As described above, the predetermined object may include all kinds of objects blocking a lane so that driving of the vehicle 100 is impossible or interrupted. The predetermined object may correspond to an icy road, a pedestrian, another vehicle, a construction sign, a traffic signal such as a traffic light, or the like that the vehicle 100 should avoid, and may be received by the route provision apparatus 800 as the external information.

The processor 830 may determine whether or not the predetermined object guided by the external information is located within a reference range based on the driving path of the vehicle 100.

Whether or not the predetermined object is located within the reference range may vary depending on a lane in which the vehicle 100 is traveling and a position where the predetermined object is located.

For example, external information for guiding a sign indicating construction work taking place in a third lane 1 km ahead of the vehicle while the vehicle is traveling in a first lane may be received. If the reference range is set to 1 m based on the vehicle 100, the sign is located outside the reference range. This is because the third lane is located outside the reference range of 1 m based on the vehicle 100 if the vehicle 100 is continuously traveling in the first lane. In some implementations, if the reference range is set to 10 m based on the vehicle 100, the sign is located within the reference range.

The processor 830 may generate the dynamic information based on the external information when the predetermined object is located within the reference range, but may not generate the dynamic information when the predetermined object is located outside the reference range. That is, the dynamic information may be generated only when the predetermined object guided by the external information is located on the driving path of the vehicle 100 or is within a reference range that may affect the driving path of the vehicle 100.

The route provision apparatus may generate the autonomous driving visibility information by integrating information received through the first communication module and information received through the second communication module into one, which may result in generating and providing optimal autonomous driving visibility information capable of complementing different types of information provided through such different communication modules. This is because information received through the first communication module cannot reflect information in real time but such limitation may be complemented by information received through the second communication module.

Furthermore, when there is information received through the second communication module, the processor 830 controls the first communication module so as not to receive information corresponding to the received information, so that the bandwidth of the first communication module can be used less than that used in the related art. That is, the resource usage of the first communication module can be minimized.

Hereinafter, the processor 830 capable of performing the function/operation/control method of the eHorizon described above will be described in more detail with reference to the accompanying drawings.

Figure 14:
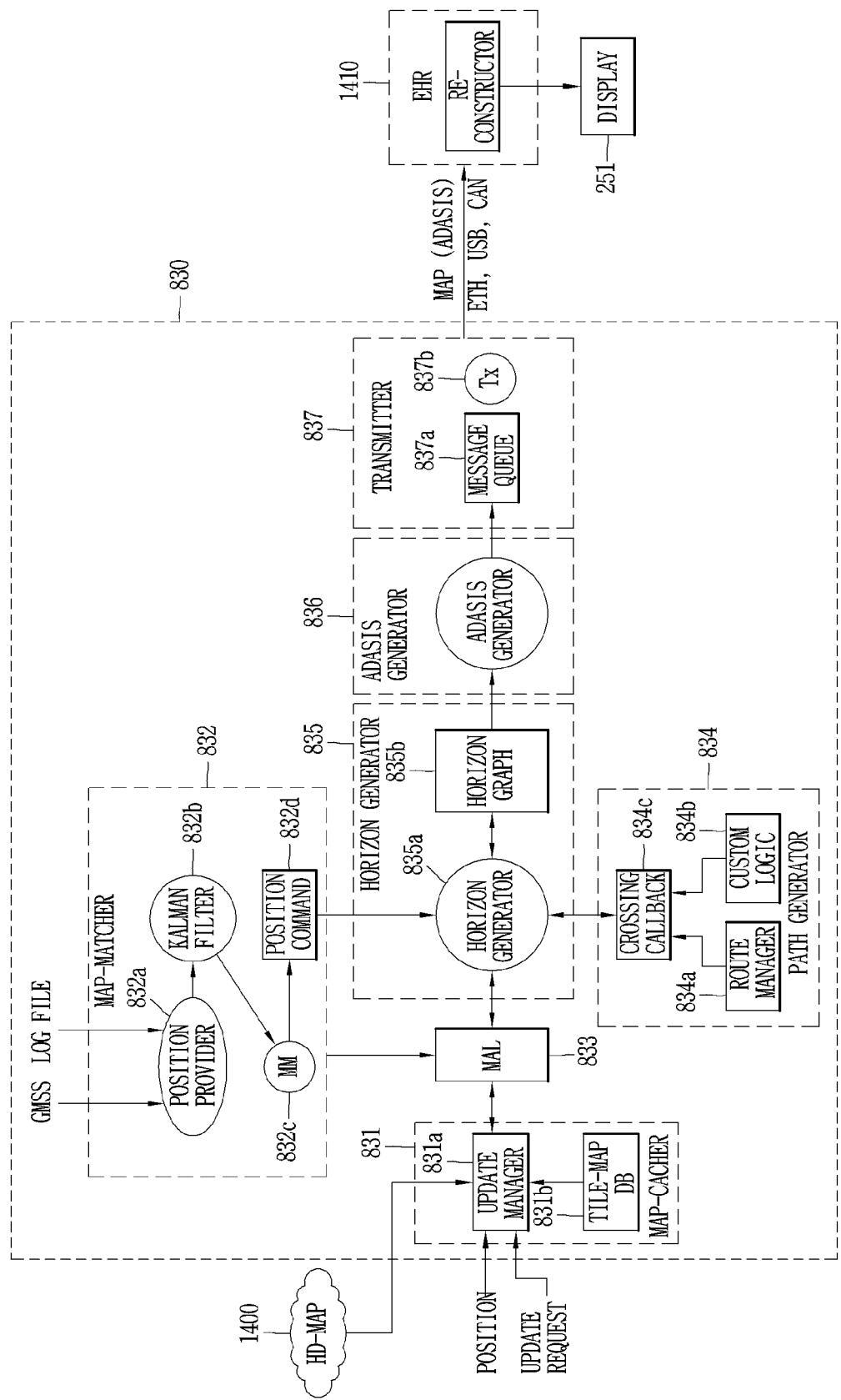
FIG. 14 is a conceptual view illustrating an example of a processor included in the route provision apparatus in detail.

FIG. 14 is a conceptual view illustrating an example of a processor included in the route provision apparatus in detail.

As described above, the route provision apparatus 800 may provide a route to a vehicle, and may include a communication unit 810, an interface unit 820, and a processor 830 (EHP).

The communication unit 810 may receive map information including a plurality of layers from a server. At this time, the processor 830 may receive map information (HD map tiles) formed in units of tiles through the communication unit 810.

The interface unit 820 may receive sensing information from one or more sensors disposed at the vehicle.

The processor 830 may include (have) the eHorizon software described herein. The route provision apparatus 830 may be an electronic horizon provider (EHP).

The processor 830 may identify one lane in which the vehicle 100 is located on a road made up of a plurality of lanes based on an image, which has been received from an image sensor, among the sensing information.

The processor 830 may also estimate an optimal route, in which the vehicle 100 is expected or planned to move based on the identified lane, in units of lanes using the map information.

The processor 830 may generate autonomous driving visibility information in which sensing information is fused with the optimal route, and transmit the generated information to a server and at least one of electric components (or electric parts) disposed at the vehicle.

Since the autonomous driving visibility information in which the optimal route and the sensing information are merged with each other is based on the HD map, it may be made up of a plurality of layers, and each layer may be understood similarly/equally by the description given with reference to FIGS. 11A and 11B.

The autonomous driving visibility information may be fused with dynamic information related to a movable object located on the optimal route.

The processor 830 may update the optimal route based on the dynamic information.

The processor 830, as illustrated in FIG. 14, may include a map cacher 831, a map matcher 832, a map-dependent APIs (MAL) 833, a path generator 834, a visibility information (Horizon) generator 835, an ADASIS generator 836, and a transmitter 837.

The map cacher 831 may store and update map information (HD map data, HD map tiles, etc.) received from a server (cloud server, external server) 1400.

The map matcher 832 may map a current position (current location) of the vehicle with the map information.

The MAL 833 may convert the map information received from the map cacher 831 and the information, in which the current position of the vehicle is mapped with the map information in the map matcher 832, into a data format capable of being used in the Horizon generator 835.

The MAL 833 may also may transmit or operate an algorithm for transmitting the map information received from the map cacher 831 and the information, in which the current position of the vehicle is mapped with the map information in the map matcher 832, to the Horizon generator 835.

The path generator 834 may provide road information, on which the vehicle can travel, on the map information. In addition, the path generator 834 may receive road information for the vehicle to travel from an AVN, and transmit information for generating a path (optimal route or sub route) on which the vehicle can travel to the Horizon generator 835.

The Horizon generator 835 may generate a plurality of route information to travel based on the current position of the vehicle and the road information for the vehicle to travel.

The ADASIS generator 836 may generate an ADASIS message by converting the plurality of route information generated by the Horizon generator 835 into a message format.

In addition, the transmitter 837 may transmit the ADASIS message generated in the message format to electric components disposed at the vehicle.

Hereinafter, each component will be described in more detail.

The map cacher 831 may request for tile-based map (or tile-map) information (HD map tile required for the vehicle) among a plurality of tile-map information (a plurality of HD map tiles) existing in the server 1400.

Also, the map cacher 831 may store (or temporarily store) the tile-map information (HD map tile) received from the server 1400.

The map cacher 831 may include an update manager 831a that requests and receives at least one of the plurality of tile-map information existing in the server 1400 based on satisfaction of a preset condition, and a cache memory 831b that stores the tile-map information received from the server 1400.

The cache memory 831b may be referred to as a tile-map database.

The preset condition may refer to a condition for the route provision apparatus (specifically, the map cacher 831) to request and receive tile-map information required for the vehicle from the server 1400.

The preset condition may include at least one of a case in which tile-map information of a region where the vehicle is currently located is needed to be updated, a case in which tile-map information of a specific region is requested from an external device, and a case in which a unit of tile is changed in size.

For example, when the preset condition is satisfied, the map cacher 831 included in the processor 830 may request, to the server, tile-map information at which the vehicle is currently located, tile-map information of a specific region requested from an external device, or a tile-map information in which a unit of tile has changed in size.

When receiving new tile-map information from the server 1400, the update manager 831a may also delete, from the cache memory 831b, existing map information related to a region indicated (included) in the received map information, and tile-map information related to a region where the vehicle has already passed.

The map matcher 832 may include a position providing module (position provider) 832a that extracts a Global Navigation Satellite System (GNSS) signal received from a satellite (e.g., a signal indicating a current position of the vehicle received from a satellite), a driving history, and data indicating the current position of the vehicle from one of electric components disposed at the vehicle, a filter (Kalman filter) 832b that generates location information indicating the current position of the vehicle by filtering the data extracted in the position provider 832a, and a map matching (MM) module 832c that matches the location information indicating the current position of the vehicle with the tile-map information stored in the map cacher 831 and performs a location control (position control) for the current position of the vehicle to be located at a center of the display.

Here, performing the location control so that the current position of the vehicle is located at the center of the display may include mapping the map information received through the server 1400 based on the current position of the vehicle.

The map matching module 832c may request the map cacher 831 to receive tile-map information for mapping the location information from the server when the tile-map information for mapping the location information is not stored in the map cacher 831.

In response to the request, the map cacher 831 may request and receive the tile-map information (HD map tile) requested by the map matching module 832c from the server 1400, and transmit the received tile-map information to the map matcher 832 (or the map matching module 832c).

Also, the map matching module 832c may generate a position command 832d indicating the current position of the vehicle and transmit the generated position command 832d to the Horizon generator 835. The position command may be used to generate visibility information based on the current position of the vehicle when the Horizon generator generates the visibility information.

The MAL 833 may convert the map information (the tile-map information, HD map tile) received from the map cacher 831 and the information, in which the current position of the vehicle is mapped with the map information in the map matcher 832, into a data format capable of being used in the Horizon generator 835.

The path generator 834 may extract road information on which the vehicle can travel from the received tile-map information (HD map tile), and provide the extracted road information to the Horizon generator 835 to calculate an optimal route and sub paths on which the vehicle is predicted to travel.

That is, the received map information may include various types of roads, for example, a road on which vehicles can pass, a road on which vehicles cannot pass (e.g., a sidewalk, a bicycle-only road, a narrow road), and the like.

The path generator 834 may extract road information on which the vehicle can travel among the various types of roads included in the map information. In this case, the road information may also include direction information for a one-way road.

Specifically, the path generator 834 may include a route manager 834a that assigns a score to route information required for the vehicle to drive from a current position to a destination among the road information for the vehicle to travel, on the tile-map information received from the server 1400, a customized logic (Custom Logic) module 834b that assigns a score for a road after the next intersection according to characteristics of a road, on which the vehicle is currently located, when a destination is not input, and a Crossing callback (CB) module 834c that provides information reflecting the scores assigned by the route manager 834a and the scores assigned by the Custom logic module 834b to the Horizon generator 835.

The CB module 834c may perform path guidance based on the scores assigned by the route manager 834a (or transmit the road information to which the route manager 834a has assigned the scores) when the vehicle is located on a path corresponding to the route information required to travel to the destination. On the other hand, the CB module 834c may perform a path guidance based on the scores assigned by the Custom logic module 834b (or transmit the road information to which the Custom logic module 834b has assigned the scores) when the vehicle has deviated from a path corresponding to the route information required to travel to the destination.

The Horizon generator 835 may generate, when a destination is set, an optimal route and autonomous driving visibility information required to travel to the destination based on the road information assigned with the scores by the route manager 834.

Also, when a destination is not set or the vehicle has deviated from a path corresponding to route information required for the vehicle to travel to the destination, the Horizon generator 835 may generate an optimal route or a sub path based on the road assigned with the score by the Custom logic module 834b and generate autonomous driving visibility information corresponding to the optimal route and the sub path.

The Horizon generator 835 may generate a visibility information tree graph (Horizon graph) with respect to the current position of the vehicle, based on the position of the vehicle mapped with map information in the map matcher 832 and the road information for the vehicle to travel, processed in the path generator 834.

Here, the Horizon graph may refer to information in which roads for which the autonomous driving visibility information has been generated are connected at each intersection to the optimal route and the sub path from the current position of the vehicle to the destination.

Since the information is generated by connecting the roads for which the autonomous driving visibility information has been generated at the intersections into the shape of branches of a tree, the information may be referred to as a Horizon tree graph.

In addition, since the autonomous driving visibility information is generated not only for the optimal route from the current position of the vehicle to the destination but also for a sub path different from the optimal route (i.e., a road corresponding to a sub path other than a road corresponding to an optimal route at an intersection), the autonomous driving visibility information may be generated for a plurality of paths (an optimal route and a plurality of sub paths), not merely for a single path (the optimal route).

Accordingly, the autonomous driving visibility information from the current position of the vehicle to the destination can be generated in the shape of branches of a tree, and thus it can be referred to as the Horizon tree graph.

The Horizon generator 835 (or the Horizon generation module 835a) may set a length of a Horizon graph 835b and a width of a tree link, and generate the Horizon tree graph for roads within a predetermined range from a road where the vehicle is currently located, on the basis of the current position of the vehicle and the tile-map information.

Here, the width of the tree link may refer to a width for generating the autonomous driving visibility information (e.g., a width allowed for generating visibility information related to a sub path up to a preset width (or radius) with respect to an optimal route).

Also, the Horizon generator 835 may connect roads included in the generated Horizon tree graph in units of lanes.

As described above, the autonomous driving visibility information may be used to calculate an optimal route, detect an event, detect vehicle traffic, or determine dynamic information in units of lanes included in a road other than in units of roads.

Accordingly, the Horizon generator 835 can generate the Horizon tree graph not by merely connecting the roads included in the generated Horizon tree graph but by connecting the roads in units of lanes included in the roads.

Also, the Horizon generator 835 may generate different Horizon tree graphs according to preset generation criteria.

For example, the Horizon generator 835 may generate an optimal route and a sub path differently depending on a user input (or user request) and criteria for generating the optimal route and the sub path (e.g., the fastest route to a destination, the shortest route, a free route, a highway-preferred route, etc.), and accordingly generate the autonomous driving visibility information differently.

Generating autonomous driving visibility information differently may indicate generating autonomous driving visibility information for different roads. Therefore, the generation of the autonomous driving visibility information for the different roads may mean generation of a different Horizon tree graph.

The Horizon generator 835 may generate an optimal route and a sub path on which the vehicle is expected to travel, based on road information for the vehicle to travel, transmitted from the path generator 834.

Also, the Horizon generator 835 may generate or update the optimal route and the sub path by merging (fusing) dynamic information with the autonomous driving visibility information.

The ADASIS generator 836 may convert the Horizon tree graph generated by the Horizon generator 835 into an ADASIS message in a preset message format.

As described above, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assistance Systems Interface Specification (ADASIS)."

Accordingly, the EHP (the processor 830 of the route provision apparatus) may include the ADASIS generator 836 that converts the Horizon tree graph (i.e., autonomous driving visibility information or an optimal route and a sub path) into a preset message format (e.g., a message format complying with the standard).

The ADASIS message may correspond to the autonomous driving visibility information. That is, since the Horizon tree graph corresponding to the autonomous driving visibility information is converted into the message format, the ADASIS message may correspond to the autonomous driving visibility information.

The transmitter 837 may include a message queue module 837a that transmits the ADASIS message to at least one of the electric components disposed at the vehicle.

The message queue module 837a may transmit the ADASIS message to at least one of the electric components disposed at the vehicle in a preset manner (Tx).

Here, the preset manner may be to transmit the ADASIS message in the order in which the ADASIS message is generated according to a function Tx or condition for transmitting a message, to transmit a specific message earlier based on a message content, or to preferentially transmit a message requested from an electric component disposed at the vehicle.

Meanwhile, the present disclosure can provide a control method capable of generating EHP information even when a high-definition map is not smoothly supplied due to a poor communication state with a server.

Hereinafter, a detailed description will be given of a method for generating EHP information used for autonomous driving in a poor communication state between the route provision apparatus of the present disclosure and the server, with reference to the accompanying drawings.

First, the processor 830 included in the route provision apparatus may receive map information from the navigation system 770 provided in the vehicle, other than the server 1400, when a state of receiving the map information from the server 1400 satisfies a preset condition.

Here, the preset condition may mean a condition in which the communication state with the server is not good.

Specifically, the preset condition may include at least one of: when it is impossible to receive map information from the server through communication, when a communication rate for receiving map information from the server is slower than or equal to a predetermined speed, or when there is no map information received from the server for a predetermined distance ahead of the vehicle.

That is, the processor 830 may generate EHP information including at least one of autonomous driving visibility information and an optimal route in units of lanes, based on map information (i.e., HD map information) having a plurality of layers received from the server, and transmit the EHP information to an electric component (or ADAS application) provided in the vehicle, such that the vehicle can autonomously travel.

On the other hand, when a preset condition is satisfied in which communication with the server is poor, the processor 830 may receive map information from the navigation system 770 installed in the vehicle, and not from the server.

Here, the map information received from the navigation system 770 may not be HD map information, but may be standard-definition (SD) map information.

Also, the processor 830 may generate a SLAM (Simultaneous Localization and Mapping) map by fusing (merging) sensing information received from one or more sensors provided in the vehicle with the map information received from the navigation system 770.

Here, SLAM may refer to a technology in which a moving robot creates a map of a surrounding environment while measuring its own location during a current time interval.

The SLAM map to which the SLAM technology is applied may refer to a map that is generated for a surrounding environment, without external assistance, through sensors attached to the vehicle while the vehicle is traveling in an area (unknown environment) for which HD map (or autonomous driving visibility information) is not provided.

Figure 15A:
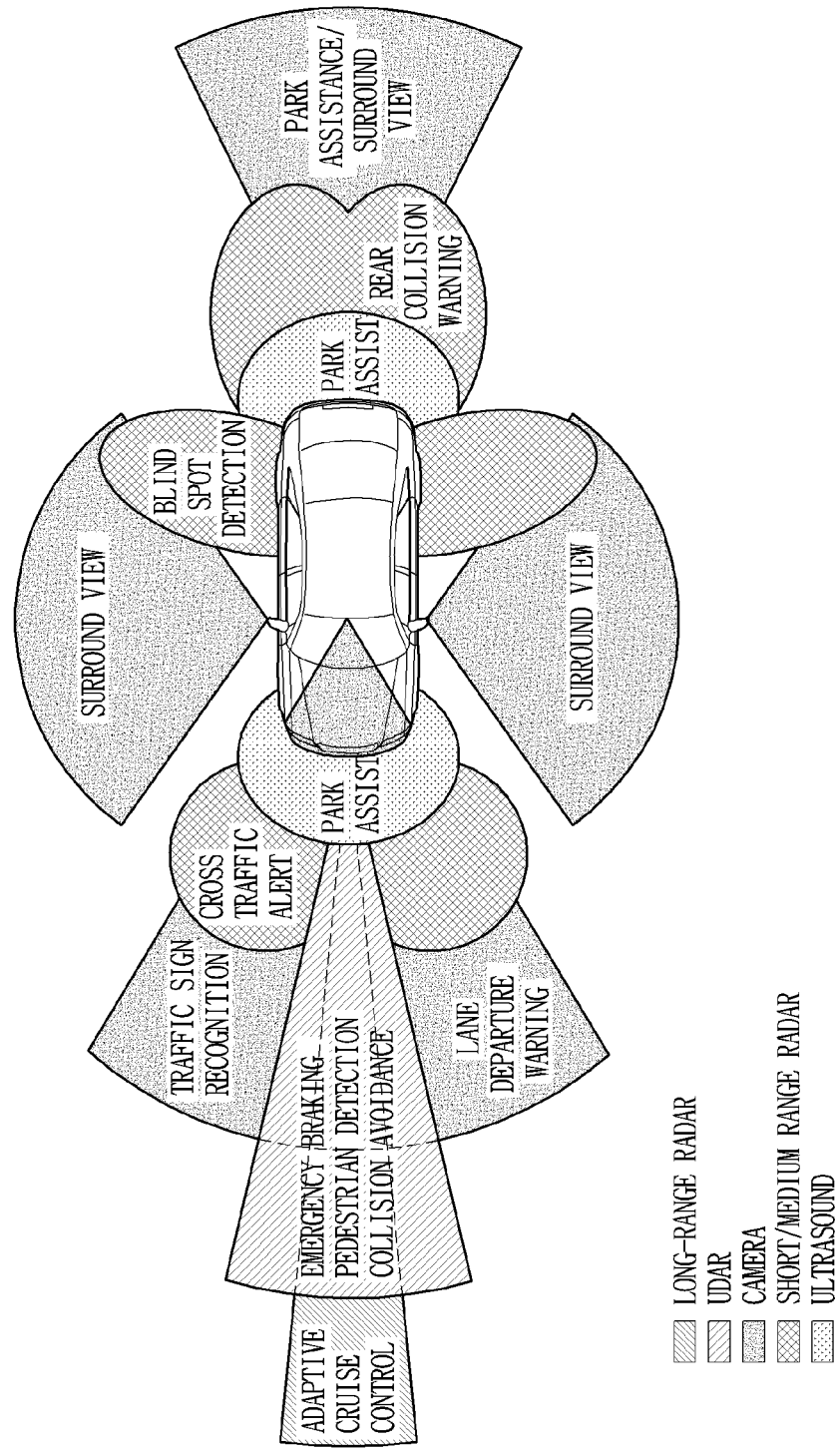
FIGS. 15A and 15B are conceptual views illustrating types of sensors of a vehicle that are used in the route provision apparatus.

Examples of sensors of the vehicle that sense the sensing information used for generating the SLAM map may be sensors as illustrated in FIG. 15A.

Figure 15B:
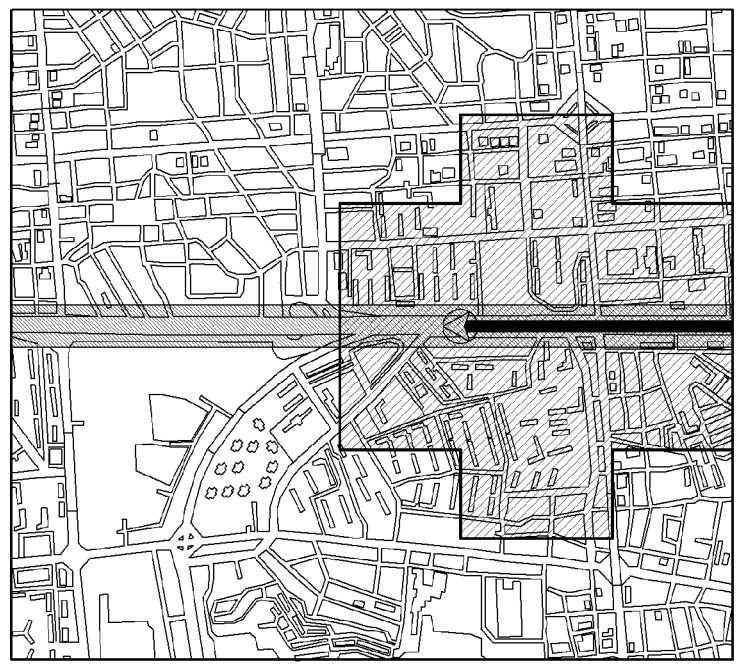

FIGS. 15A and 15B are conceptual views illustrating types of sensors of a vehicle that are used in a route provision apparatus in accordance with the present disclosure.

At least one sensor provided in the vehicle may mean all sensors included in the sensing unit 120 of the vehicle described above.

Specifically, the at least one sensor provided in the vehicle may include vehicle sensors (V. sensors) that sense the operation of the vehicle itself (e.g., a heading direction of the vehicle, a steering angle, speed, whether a brake operates, whether an acceleration operates, whether a lamp is lighted on, etc.), and safety sensors (S.Sensors) (e.g., a camera, LiDAR, radar, an ultrasonic sensor, an ultra-wideband (UWB) sensors, etc.)

In addition, in terms of sensing information related to driving of another vehicle from the another vehicle through V2X communication of the communication unit 810, the communication unit 810 (or the V2X module of the communication unit) may also be understood to be included in the category of the sensor.

Referring to FIG. 15A, the sensors described herein are mainly safety sensors (camera, LiDAR, RADAR, ultrasonic sensor, ultrawideband (UWB) sensor, etc.) that sense surrounding information of the vehicle. However, it should be noticed that the present disclosure is not limited thereto.

RADAR (Radio Detection and Ranging) may be mainly used to sense speed of moving objects using radio waves. As illustrated in FIG. 15A, the RADAR may have the longest sensing range, and may sense an object farthest from the vehicle.

Meanwhile, LIDAR (Light Imaging Detection and Ranging) may detect an object using laser.

Since the LIDAR uses a short frequency, it can detect even small objects, and generate accurate 3D monochromatic images. However, the LIDAR may be limited in use at night and in cloudy weather.

The RADAR can easily operate even in cloudy weather and at night. However, the RADAR, compared to the LIDAR, has disadvantages in that it is difficult to detect small objects and does not provide precise images of objects.

As illustrated in FIG. 15A, since the RADAR has a narrow viewing angle but a long sensing range, it can be mainly used for an adaptive cruise control (ACC) function among advanced driver assistant system (ADAS) functions.

In addition, since the LIDAR has a shorter sensing range than the RADAR but has a wider viewing angle than the RADAR, and can accurately detect even small objects, it can be mainly used for emergency braking, pedestrian detection, and collision avoidance functions, among the ADAS functions.

As illustrated in FIG. 15A, the camera among those sensors of the vehicle that can be used in the route provision apparatus 800 has a shorter sensing range than the RADAR and the LIDAR but may be configured to have a wider viewing angle.

The camera may capture a space around the vehicle as an image (or video) through an image sensor. Since the camera directly captures (photographs) the space, it is possible to sense text, pictures, etc. captured by the camera. Accordingly, the camera can be used for various functions, such as traffic sign recognition, lane departure warning, surround view, and park assistance, among the ADAS functions.

In addition, the RADAR may also be used for cross traffic alert, blind spot detection, and rear collision warning.

In addition, the ultrasonic sensor may be mainly used for a park assistance function.

As illustrated in FIG. 15A, the plurality of sensors provided in the vehicle 100 usable in the route provision apparatus 800 may have different sensing ranges, respectively, and may have different advantages and disadvantages.

Accordingly, the route provision apparatus, as illustrated in FIG. 15B, can generate a SLAM map in an optimized method by variously combining the plurality of sensors having different sensing ranges.

At this time, as illustrated in FIG. 15B, the route provision apparatus may additionally sense information by using the plurality of sensors having the different sensing ranges, and generate the SLAM map using the sensed information.

The sensing range of one or more sensors provided in the vehicle may vary depending on types of sensors, as illustrated in FIG. 15B.

Figure 16:
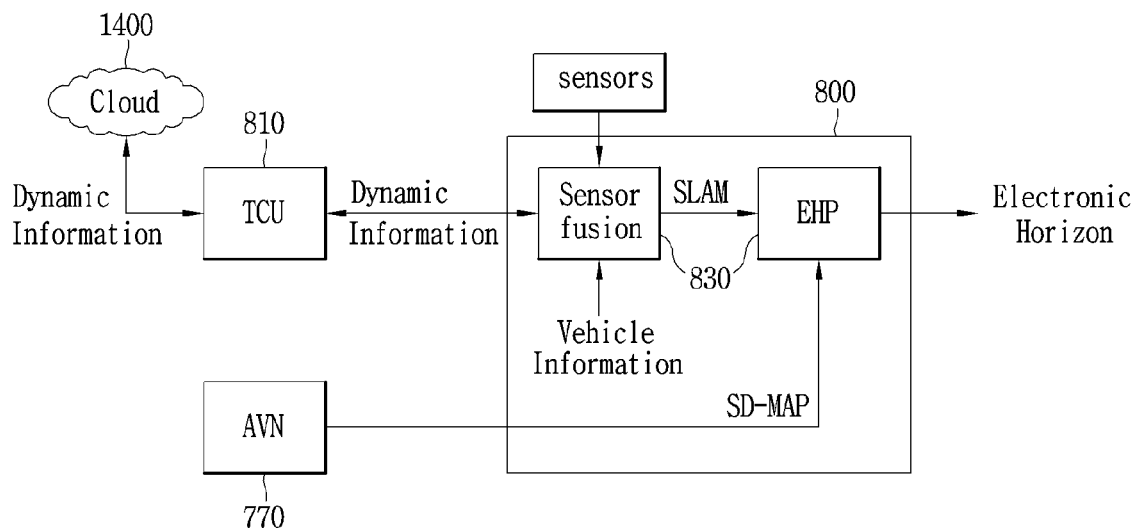
FIG. 16 is a conceptual view illustrating a method in which the route provision apparatus generates a SLAM map.

FIG. 16 is a conceptual view illustrating a method in which a route provision apparatus generates a SLAM map.

As described above, the route provision apparatus 800 may receive map information from the server 1400 through the communication unit 810 (TCU) provided in the vehicle.

On the other hand, when communication with the server 1400 is poor, that is, as described above, when a state of receiving the map information from the server satisfies a preset condition (i.e., at least one of: when the map information cannot be received from the server, when a communication rate for receiving the map information from the server is slower than or equal to a predetermined speed, or when there is no map information received from the server for a predetermined distance ahead of the vehicle), the processor 830 may generate the SLAM map by fusing the map information received from the navigation system 770 (Audio Video Navigation (AVN)) provided in the vehicle, and not received from the server.

In this case, the processor 830 may receive route information to a destination and map information on which the route information has been reflected from the navigation system.

The map information received from the server may be HD map information, and the map information received from the navigation system may be SD map information.

When the processor 830 fuses the map information received from the navigation system with the sensing information sensed by the sensors of the vehicle, the processor 830 may perform the fusion based on the route information to the destination.

That is, the processor 830 may not generate a SLAM map for all map information received from the navigation system, but generate a SLAM map only for a predetermined range including route information, along which the vehicle is to travel to a destination, based on the route information.

Meanwhile, the processor 830 may further receive dynamic information from the server or other nearby vehicles.

The processor 830 may reflect the received dynamic information on the SLAM map.

Even in this case, the processor 830 may not fuse all of the received dynamic information with the SD map information received from the navigation system.

That is, the processor 830 may reflect, on the SLAM map, only the dynamic information existing within a predetermined range based on the route information to the destination among all the received dynamic information. The predetermined range may correspond to the aforementioned predetermined range in which the SLAM map has been generated.

The processor 830 may set (designate) the SLAM map on which the dynamic information has been reflected as autonomous driving visibility information, and autonomously drive the vehicle using the SLAM map on which the dynamic information has been reflected.

That is, even if HD map information is not received from the server, the processor 830 can receive SD map information from the navigation system, fuse sensing information and dynamic information to generate a SLAM map, and utilize it as autonomous driving visibility information.

Here, the dynamic information may refer to information on an object that cannot be detected by a sensor provided in the vehicle (or is out of a detectable area).

Since the dynamic information includes only information related to an object, not HD map information, its capacity may be small. Accordingly, it can be quickly received from the server even if the communication rate with the server 1400 is slower than or equal to a predetermined speed.

In addition, when the processor 830 cannot perform communication with the server 1400, the processor 830 may receive dynamic information from other nearby vehicles through V2X communication.

The processor 830 may continuously generate the SLAM map as the vehicle is traveling along the route information.

When the vehicle is traveling in an area where communication with the server is not good (for example, in a complex downtown, tunnel, mountain road, etc.), even other nearby vehicles as well as the vehicle 100 may be highly likely to have problems in communication with the server.

In this case, not only the vehicle 100 but also other nearby vehicles may not be able to receive HD map information in real time, which may delay the generation of autonomous driving visibility information.

To solve this, the processor 830 may transmit the generated SLAM map to other nearby vehicles existing within a preset distance through V2X communication.

The other nearby vehicles that have received the SLAM map may perform autonomous driving by using the SLAM map as the autonomous driving visibility information.

Here, the preset distance may be a distance in which V2X communication can be made or a distance set by a user.

In addition, the processor 830 may determine information related to a lane in which the vehicle is currently traveling, a surrounding environment, and surrounding objects through sensing information, and generate a SLAM map so that the determined information is reflected on map information received from the navigation system.

That is, the processor 830 may fuse the sensing information with the SD map information received from the navigation system to independently generate map information (HD map information) corresponding to a plurality of layers received from the server.

Also, the processor 830 may use the generated SLAM map to generate an optimal route in units of lanes and autonomous driving visibility information. That is, the processor 830 may use the SLAM map as the HD map (or the map information including the plurality of layers received from the server) to generate the optimal route in units of lanes and the autonomous driving visibility information.

In addition, when the preset condition is no longer satisfied (i.e., when communication with the server is established, the communication speed with the server is at least a predetermined speed or faster, or map information received from the server exists for at least a predetermined distance ahead of the vehicle), the processor 830 may generate the autonomous driving visibility information using the map information (HD map information) received from the server and control the vehicle to autonomously travel based on the generated autonomous driving visibility information.

Meanwhile, although it has been described above that the SLAM map is generated by the processor 830, a sensor fusion unit that fuses data may be provided separately.

Referring to FIG. 16, the route provision apparatus 800 may further include a sensor fusion unit that generates SLAM data by fusing dynamic information received from the server or nearby vehicles, sensing information sensed by one or more sensors provided in the vehicle, and vehicle information.

When a state of receiving the map information from the server satisfies a preset condition, the sensor fusion unit may transmit the SLAM data to the processor 830, and the processor 830 may generate a SLAM map by fusing the SLAM data with SD map information received from the navigation system.

In FIG. 16, the sensor fusion unit which is separately provided to generate the SLAM data by using the sensing information, the dynamic information, and the vehicle information, and transmit the SLAM data to the processor 830, and the processor 830 generates the SLAM map. However, the present disclosure is not limited thereto, and the function performed by the sensor fusion unit may also be performed by the processor 830.

That is, in this specification, the generation of the SLAM map may be performed by the independent sensor fusion unit or by the processor 830 formed integrally with the sensor fusion unit.

Figure 17:
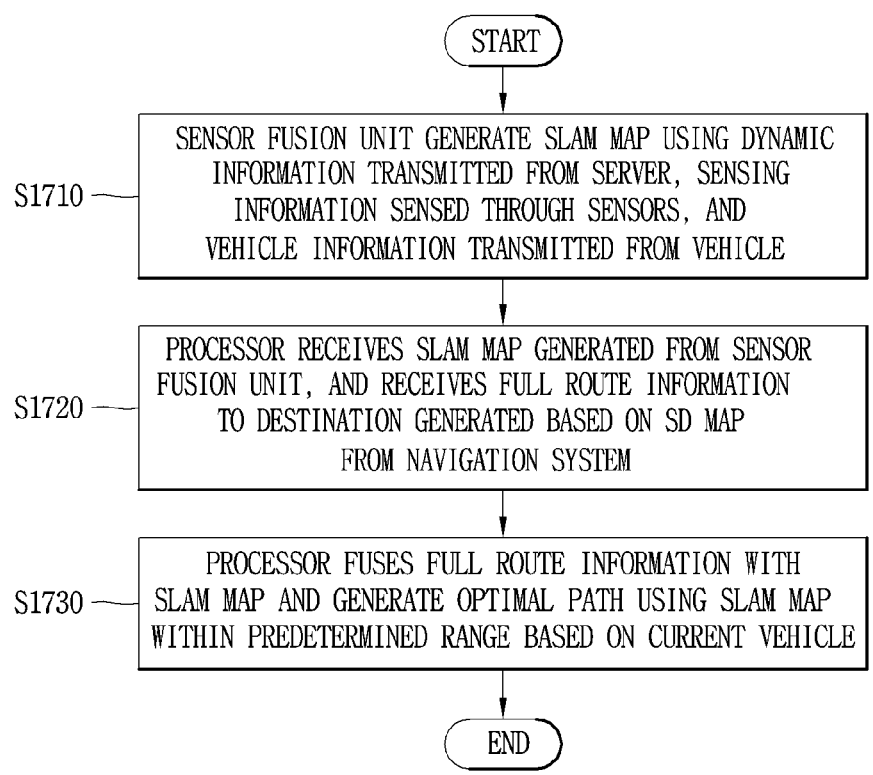
FIG. 17 is a flowchart illustrating a representative control method.
Figure 18:
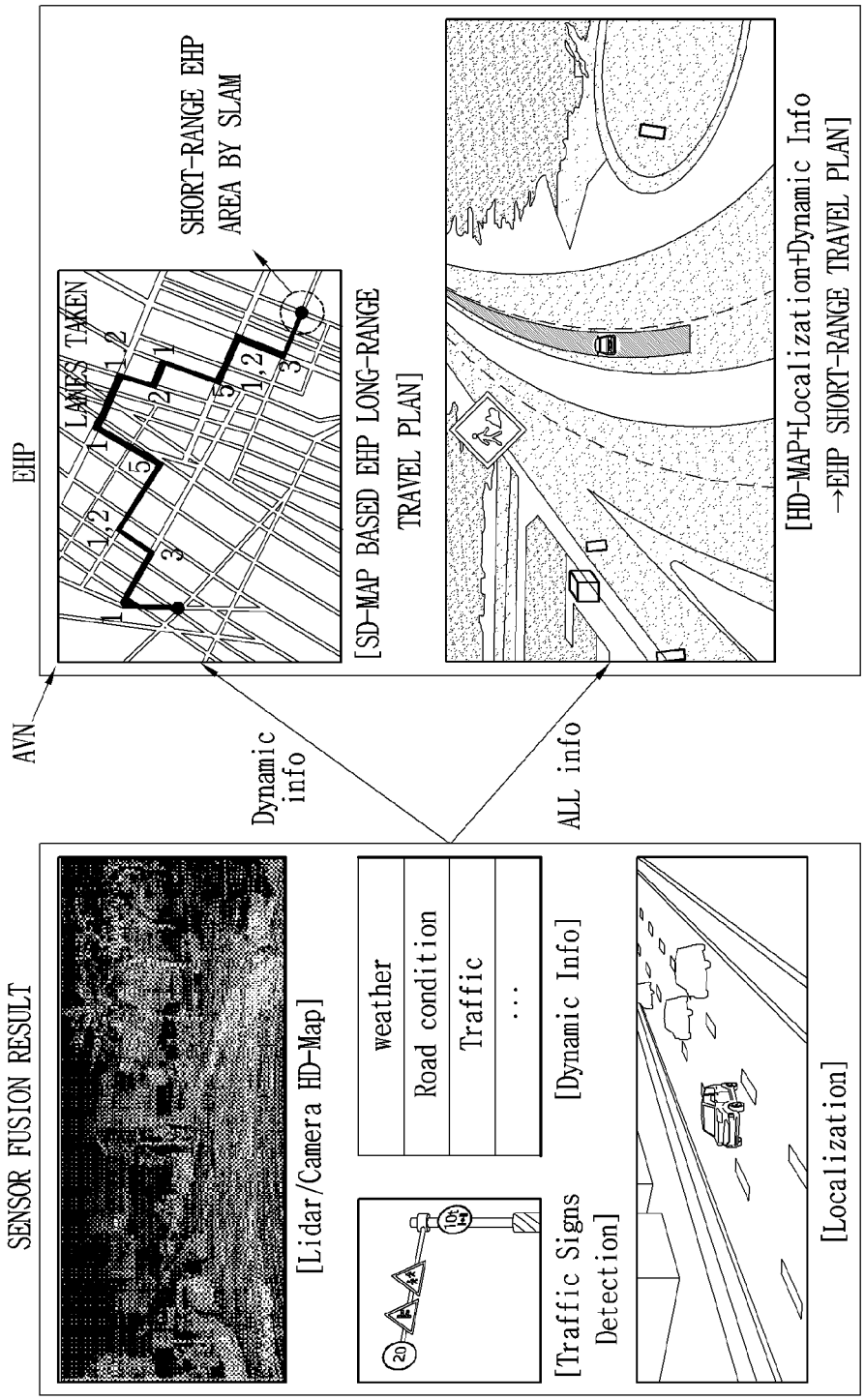
FIGS. 18 and 19 are conceptual views illustrating the control method illustrated in FIG. 17.
Figure 19:
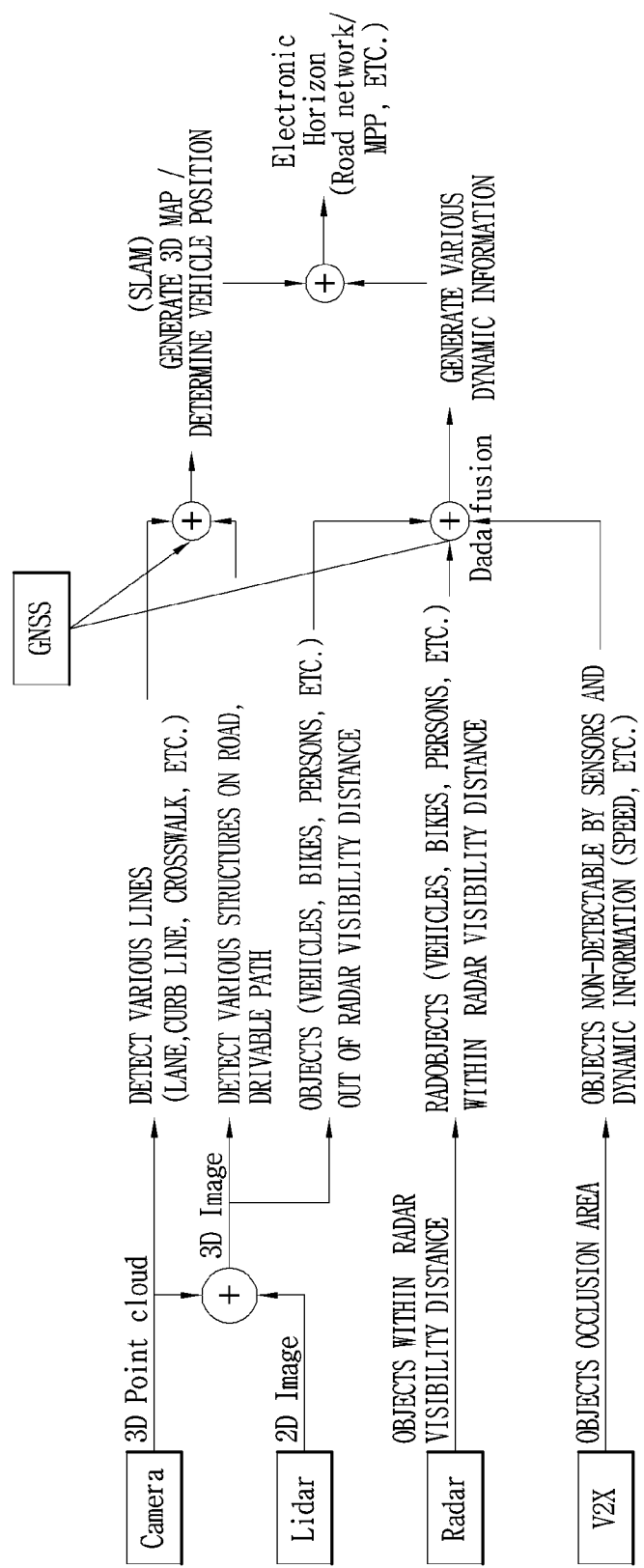

FIG. 17 is a flowchart illustrating a representative control method and FIGS. 18 and 19 are conceptual views illustrating the control method illustrated in FIG. 17.

When the sensor fusion unit exists, the sensor fusion unit may generate SLAM data using dynamic information transmitted from the server, sensing information sensed by the sensors, and vehicle information transmitted from the vehicle (S1710).

The processor 830 may receive the SLAM data generated by the sensor fusion unit, and receive full route information to a destination, which is generated based on SD map, from the navigation system (S1720).

Thereafter, the processor 830 may fuse the SLAM data with the full route information and generate an optimal route using the SLAM map, in which the SLAM data has been fused, within a predetermined range based on the current location of the vehicle (S1730).

Referring to FIG. 18, the processor 830 may receive image information (LIDAR/camera HD-map), traffic sign detection information, dynamic information (weather, road conditions, traffic conditions, object information, etc.) and information related to the current location of the vehicle (localization) from the sensors provided in the vehicle.

As illustrated on the upper right of FIG. 18, when the state of receiving the map information from the server satisfies a preset condition (i.e., when communication with the server is not good), the processor 830 may fuse the sensing information and the dynamic information based on the SD map information and route information received from the navigation system, and generate the SLAM map based on the current location of the vehicle.

The SLAM map may be continuously generated as the vehicle is traveling.

On the other hand, when communication with the server is good, as illustrated on the lower right of FIG. 18, the processor 830 may receive HD map from the server and fuse it with the current location of the vehicle. The processor 830 may then fuse it with the dynamic information so as to generate and provide autonomous driving visibility information and an optimal route in real time.

Referring to FIG. 19, the processor 830 may receive sensing information from the various sensors and detect various lines through the camera, so as to detect a lane, a curb, a crosswalk, and the like.

The processor 830 may also detect through the LIDAR objects (e.g., vehicles, bicycles, persons, etc.) except for structures existing on a road, a drivable road, or a visibility range of RADAR.

Also, the processor 830 may detect an object existing in a RADAR visibility range through the RADAR.

The processor 830 may also receive dynamic information corresponding to objects, which cannot be detected through the sensors, from the server or nearby vehicles through V2X communication.

The processor 830 may generate a SLAM map by fusing map-related information, among those sensing information sensed by the camera and the LIDAR, with the SD map information.

Also, the sensor fusion unit may generate dynamic information by the fusion of object-related information among those sensing information sensed through the LIDAR, RADAR, and V2X.

The processor 830 may fuse the generated SLAM map with the dynamic information to generate EHP information for producing autonomous driving visibility information and an optimal route.

Hereinafter, effects of a route provision apparatus and a route provision method therefor according to the present disclosure will be described.

First, the present disclosure can provide a route provision apparatus that is optimized for generating or updating autonomous driving visibility information.

Second, the present disclosure can provide a new control method capable of generating a SLAM map using an SD map pre-stored in the vehicle and sensing information, so that the vehicle can autonomously drive itself using the generated SLAM map as autonomous driving visibility information, in case where an HD map required to generate the autonomous driving visibility information is not smoothly received from a server.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. A route provision apparatus for providing a route to a vehicle, the apparatus comprising:
   a transceiver configured to communicate with a server;
   one or more sensors disposed in the vehicle for obtaining sensing information; and a processor configured to:
identify a lane in which the vehicle is traveling among a plurality of lanes of a road based on an image received from an image sensor among the sensing information,
estimate, using received map information, an optimal route for the vehicle in lane units based on the identified lane,
generate electronic horizon data by fusing the sensing information with the optimal route for transmission to the server and at least one electric component disposed in the vehicle, and
fuse dynamic information related to a movable object located along the optimal route with the electronic horizon data to update the optimal route based on the dynamic information,
wherein the map information is received from a navigation system provided at the vehicle and not from the server based on a communication state with the server satisfying a preset condition, and
wherein the processor is further configured to fuse the sensing information received from the one or more sensors with the map information received from the navigation system to generate a Simultaneous Localization and Mapping (SLAM) map,
wherein the transceiver further comprises a V2X transceiver; and
wherein the processor is further configured to receive, through the V2X transceiver, dynamic information from other vehicles and apply the received dynamic information to the SLAM map, wherein the dynamic information is limited to a predetermined range based on route information to a destination, and
wherein the received dynamic information that is applied to the SLAM map includes information on objects which are outside of a detectable area of the one or more sensors.

2. The apparatus of claim 1, wherein the preset condition includes at least one of: not being able to receive map information from the server, a communication rate for receiving map information from the server being slower than or equal to a predetermined speed, or there being no map information received from the server for a predetermined distance ahead of the vehicle.

3. The apparatus of claim 1, wherein the processor is further configured to receive route information to a destination from the navigation system, and wherein the received map information reflects the route information to the destination.

4. The apparatus of claim 3, wherein the map information received from the navigation system is standard-definition (SD) map information.

5. The apparatus of claim 3, wherein fusing the sensing information with the map information is performed based on the route information to the destination.

6. The apparatus of claim 5, wherein the sensing information used for generating the SLAM map is limited to sensing information within a predetermined range based on the route information.

7. The apparatus of claim 1, wherein the SLAM map, to which the dynamic information has been applied, is set as electronic horizon data, and the processor is configured to cause the vehicle to be autonomously driven based on the SLAM map.

8. The apparatus of claim 1, wherein the processor is configured to continuously generate the SLAM map as the vehicle is traveling according to the route information.

9. The apparatus of claim 1, wherein the processor is configured to transmit the generated the SLAM map to other vehicles within a preset distance through V2X communication.

10. The apparatus of claim 1, wherein the processor is further configured to determine information related to the lane in which the vehicle is traveling, a surrounding environment, and surrounding objects based on the sensing information, wherein the SLAM map is generated such that the determined information is reflected on the map information received from the navigation system.

11. The apparatus of claim 1, wherein the optimal route and the electronic horizon data are generated based on the generated SLAM map.

12. The apparatus of claim 1, wherein the map information is received from the server based on the communication state with the server not satisfying the preset condition, and
the map information received from the server is high-definition (HD) map information.

* * * * *